US009536146B2

(12) United States Patent
Zheng et al.

(10) Patent No.: US 9,536,146 B2
(45) Date of Patent: Jan. 3, 2017

(54) DETERMINE SPATIOTEMPORAL CAUSAL INTERACTIONS IN DATA

(71) Applicant: Microsoft Technology Licensing, LLC., Redmond, WA (US)

(72) Inventors: Yu Zheng, Beijing (CN); Xing Xie, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/587,270

(22) Filed: Dec. 31, 2014

(65) Prior Publication Data
US 2015/0117713 A1  Apr. 30, 2015

Related U.S. Application Data

(63) Continuation of application No. 13/333,535, filed on Dec. 21, 2011, now abandoned.

(51) Int. Cl.
*G06K 9/00* (2006.01)
*G08G 1/01* (2006.01)
(Continued)

(52) U.S. Cl.
CPC ....... *G06K 9/00624* (2013.01); *G06K 9/00476* (2013.01); *G06K 9/46* (2013.01);
(Continued)

(58) Field of Classification Search
CPC .............. G06K 9/00; G08G 1/00; G06F 17/00
(Continued)

(56) References Cited

U.S. PATENT DOCUMENTS 5,428,546 A * 6/1995 Shah ............... G08G 1/127
340/990
5,802,492 A 9/1998 DeLorme et al.
(Continued)

FOREIGN PATENT DOCUMENTS

EP  1087605 A2  3/2001
GB  2421653 A  6/2006
(Continued)

OTHER PUBLICATIONS

Adomavicius, Tuzhilin, "Toward the Next Generation of Recommender Systems: A Survey of the State-of-the-Art and Possible Extensions", retrieved on Dec. 29, 2009 at <<http://www.inf.unbix.it/~ricci/ATIS/papers/state-of-the-art-2005.pdf>>, IEEE Transactions on Knowledge and Data Engineering, vol. 17, No. 6, Jun. 2005, pp. 734-749.
(Continued)

*Primary Examiner* — Abolfazl Tabatabai
(74) *Attorney, Agent, or Firm* — Sandy Swain; Micky Minhas; Lee & Hayes, PLLC

(57) ABSTRACT

Techniques for detecting outliers in data and determining spatiotemporal causal interactions in the data are discussed. A process collects global positioning system (GPS) points in logs and identifies geographical locations to represent the area where the service vehicles travelled with a passenger. The process models traffic patterns by: partitioning the area into regions, segmenting the GPS points from the logs into time bins, and identifying the GPS points associated with transporting the passenger. The process projects the identified GPS points onto the regions to construct links connecting GPS points located in two or more regions. Furthermore, the process builds a three-dimensional unit cube to represent features of each link. The points farthest away from a center of data cluster are detected as outliers, which represent abnormal traffic patterns. The process constructs outlier trees (Continued)

to evaluate relationships of the outliers and determines the spatiotemporal causal interactions in the data.

20 Claims, 11 Drawing Sheets

(51) Int. Cl.
  *G06K 9/46* (2006.01)
  *G06F 19/00* (2011.01)
(52) U.S. Cl.
  CPC ......... *G08G 1/0112* (2013.01); *G08G 1/0133* (2013.01); *G06K 2009/4666* (2013.01)
(58) Field of Classification Search
  USPC . 382/103, 104, 236; 348/143, 169; 701/117, 701/417, 472; 707/724; 340/990
  See application file for complete search history.

(56) References Cited

U.S. PATENT DOCUMENTS

| | | | |
|---|---|---|---|
| 5,845,227 A | 12/1998 | Peterson | |
| 5,904,727 A | 5/1999 | Prabhakaran | |
| 6,023,241 A * | 2/2000 | Clapper | G01S 19/14 342/357.32 |
| 6,091,359 A | 7/2000 | Geier | |
| 6,091,956 A | 7/2000 | Hollenberg | |
| 6,122,628 A | 9/2000 | Castelli et al. | |
| 6,128,279 A | 10/2000 | O'Neil et al. | |
| 6,219,662 B1 | 4/2001 | Fuh et al. | |
| 6,243,647 B1 | 6/2001 | Berstis et al. | |
| 6,317,684 B1 * | 11/2001 | Roeseler | G01C 21/3415 340/990 |
| 6,317,686 B1 * | 11/2001 | Ran | G01C 21/3691 701/117 |
| 6,351,775 B1 | 2/2002 | Yu | |
| 6,356,838 B1 | 3/2002 | Paul | |
| 6,385,539 B1 | 5/2002 | Wilson et al. | |
| 6,411,897 B1 | 6/2002 | Gaspard, II | |
| 6,424,370 B1 | 7/2002 | Courtney | |
| 6,427,122 B1 | 7/2002 | Lin | |
| 6,430,547 B1 | 8/2002 | Busche et al. | |
| 6,446,121 B1 | 9/2002 | Shah et al. | |
| 6,493,650 B1 | 12/2002 | Rodgers et al. | |
| 6,496,814 B1 | 12/2002 | Busche | |
| 6,513,026 B1 | 1/2003 | Horvitz et al. | |
| 6,516,272 B2 | 2/2003 | Lin | |
| 6,553,310 B1 | 4/2003 | Lopke | |
| 6,584,401 B2 | 6/2003 | Kirshenbaum et al. | |
| 6,606,643 B1 | 8/2003 | Emens et al. | |
| 6,611,881 B1 | 8/2003 | Gottfurcht et al. | |
| 6,615,130 B2 | 9/2003 | Myr | |
| 6,618,507 B1 | 9/2003 | Divakaran et al. | |
| 6,625,319 B1 | 9/2003 | Krishnamachari | |
| 6,724,733 B1 | 4/2004 | Schuba et al. | |
| 6,732,120 B1 | 5/2004 | Du | |
| 6,785,704 B1 | 8/2004 | McCanne | |
| 6,816,779 B2 | 11/2004 | Chen et al. | |
| RE38,724 E | 4/2005 | Peterson | |
| 6,904,160 B2 | 6/2005 | Burgess | |
| 6,919,842 B2 | 7/2005 | Cho | |
| 6,925,447 B2 | 8/2005 | McMenimen et al. | |
| 6,965,827 B1 | 11/2005 | Wolfson | |
| 6,970,884 B2 | 11/2005 | Aggarwal | |
| 6,981,055 B1 | 12/2005 | Ahuja et al. | |
| 7,003,555 B1 | 2/2006 | Jungck | |
| 7,013,290 B2 | 3/2006 | Ananian | |
| 7,013,517 B2 | 3/2006 | Kropf | |
| 7,031,517 B1 | 4/2006 | Le et al. | |
| 7,062,562 B1 | 6/2006 | Baker et al. | |
| 7,111,061 B2 | 9/2006 | Leighton et al. | |
| 7,136,932 B1 | 11/2006 | Schneider | |
| 7,152,118 B2 | 12/2006 | Anderson, IV et al. | |
| 7,155,456 B2 | 12/2006 | Abbott, III et al. | |
| 7,171,415 B2 | 1/2007 | Kan et al. | |
| 7,194,552 B1 | 3/2007 | Schneider | |
| 7,197,500 B1 | 3/2007 | Israni et al. | |
| 7,203,693 B2 | 4/2007 | Carlbom et al. | |
| 7,219,067 B1 | 5/2007 | McMullen et al. | |
| 7,228,359 B1 | 6/2007 | Monteiro | |
| 7,233,861 B2 | 6/2007 | Van Buer et al. | |
| 7,239,962 B2 | 7/2007 | Plutowski | |
| 7,281,199 B1 | 10/2007 | Nicol et al. | |
| 7,284,051 B1 | 10/2007 | Okano et al. | |
| 7,349,768 B2 | 3/2008 | Bruce et al. | |
| 7,366,726 B2 | 4/2008 | Bellamy et al. | |
| 7,389,283 B2 | 6/2008 | Adler | |
| 7,395,250 B1 | 7/2008 | Aggarwal et al. | |
| 7,428,551 B2 | 9/2008 | Luo et al. | |
| 7,437,239 B2 | 10/2008 | Serre | |
| 7,437,372 B2 | 10/2008 | Chen et al. | |
| 7,447,588 B1 | 11/2008 | Xu et al. | |
| 7,479,897 B2 | 1/2009 | Gertsch et al. | |
| 7,493,294 B2 | 2/2009 | Flinn et al. | |
| 7,519,690 B1 | 4/2009 | Barrow et al. | |
| 7,548,936 B2 | 6/2009 | Liu et al. | |
| 7,561,959 B2 | 7/2009 | Hopkins et al. | |
| 7,574,508 B1 | 8/2009 | Kommula | |
| 7,584,159 B1 | 9/2009 | Chakrabarti et al. | |
| 7,584,301 B1 | 9/2009 | Joshi | |
| 7,603,233 B2 | 10/2009 | Tashiro | |
| 7,610,151 B2 | 10/2009 | Letchner et al. | |
| 7,660,441 B2 | 2/2010 | Chen et al. | |
| 7,685,422 B2 | 3/2010 | Isozaki et al. | |
| 7,706,964 B2 | 4/2010 | Horvitz et al. | |
| 7,707,314 B2 | 4/2010 | McCarthy et al. | |
| 7,710,984 B2 | 5/2010 | Dunk | |
| 7,739,040 B2 | 6/2010 | Horvitz | |
| 7,801,842 B2 | 9/2010 | Dalton | |
| 7,840,407 B2 | 11/2010 | Strope et al. | |
| 7,860,891 B2 | 12/2010 | Adler et al. | |
| 7,904,530 B2 | 3/2011 | Partridge et al. | |
| 7,920,965 B1 | 4/2011 | Nesbitt et al. | |
| 7,930,427 B2 | 4/2011 | Josefsberg et al. | |
| 7,948,400 B2 | 5/2011 | Horvitz et al. | |
| 7,982,635 B2 | 7/2011 | Seong | |
| 7,984,006 B2 | 7/2011 | Price | |
| 7,991,879 B2 | 8/2011 | Josefsberg et al. | |
| 8,060,462 B2 | 11/2011 | Flinn et al. | |
| 8,117,138 B2 | 2/2012 | Apte et al. | |
| 8,135,505 B2 | 3/2012 | Vengroff et al. | |
| 8,190,649 B2 | 5/2012 | Bailly | |
| 8,219,112 B1 | 7/2012 | Youssef et al. | |
| 8,275,649 B2 | 9/2012 | Zheng et al. | |
| 8,458,298 B2 | 6/2013 | Josefsberg et al. | |
| 8,562,439 B2 | 10/2013 | Shuman et al. | |
| 8,577,380 B2 | 11/2013 | Frias Martinez et al. | |
| 9,009,177 B2 * | 4/2015 | Zheng | G06F 17/30241 707/758 |
| 2001/0029425 A1 | 10/2001 | Myr | |
| 2002/0032689 A1 | 3/2002 | Abbott, III et al. | |
| 2002/0038360 A1 | 3/2002 | Andrews et al. | |
| 2002/0044690 A1 | 4/2002 | Burgess | |
| 2002/0052873 A1 | 5/2002 | Delgado et al. | |
| 2002/0062193 A1 | 5/2002 | Lin | |
| 2002/0077749 A1 | 6/2002 | Doi | |
| 2002/0128768 A1 | 9/2002 | Nakano et al. | |
| 2003/0053424 A1 | 3/2003 | Krishnamurthy et al. | |
| 2003/0063133 A1 | 4/2003 | Foote et al. | |
| 2003/0069893 A1 | 4/2003 | Kanai et al. | |
| 2003/0069968 A1 | 4/2003 | O'Neil et al. | |
| 2003/0139898 A1 | 7/2003 | Miller et al. | |
| 2003/0140040 A1 | 7/2003 | Schiller | |
| 2003/0195810 A1 | 10/2003 | Raghupathy et al. | |
| 2003/0212689 A1 | 11/2003 | Chen et al. | |
| 2003/0217070 A1 | 11/2003 | Gotoh et al. | |
| 2003/0229697 A1 | 12/2003 | Borella | |
| 2004/0039798 A1 | 2/2004 | Hotz et al. | |
| 2004/0064338 A1 | 4/2004 | Shiota et al. | |
| 2004/0073640 A1 | 4/2004 | Martin et al. | |
| 2004/0117358 A1 | 6/2004 | von Kaenel et al. | |
| 2004/0196161 A1 | 10/2004 | Bell et al. | |
| 2004/0198386 A1 | 10/2004 | Dupray | |

(56) References Cited

U.S. PATENT DOCUMENTS

| | | |
|---|---|---|
| 2004/0217884 A1 | 11/2004 | Samadani et al. |
| 2004/0220965 A1 | 11/2004 | Harville et al. |
| 2004/0264465 A1 | 12/2004 | Dunk |
| 2005/0004830 A1 | 1/2005 | Rozell et al. |
| 2005/0004903 A1 | 1/2005 | Tsuda |
| 2005/0031296 A1 | 2/2005 | Grosvenor |
| 2005/0075116 A1 | 4/2005 | Laird et al. |
| 2005/0075119 A1 | 4/2005 | Sheha et al. |
| 2005/0075782 A1 | 4/2005 | Torgunrud |
| 2005/0075784 A1 | 4/2005 | Gray et al. |
| 2005/0080554 A1 | 4/2005 | Ono et al. |
| 2005/0108261 A1 | 5/2005 | Glassy et al. |
| 2005/0131889 A1 | 6/2005 | Bennett et al. |
| 2005/0198286 A1 | 9/2005 | Xu et al. |
| 2005/0203927 A1 | 9/2005 | Sull et al. |
| 2005/0225678 A1 | 10/2005 | Zisserman et al. |
| 2005/0231394 A1 | 10/2005 | Machii et al. |
| 2005/0265317 A1 | 12/2005 | Reeves et al. |
| 2005/0278371 A1 | 12/2005 | Funk et al. |
| 2006/0020597 A1 | 1/2006 | Keating et al. |
| 2006/0036630 A1 | 2/2006 | Gray |
| 2006/0042483 A1 | 3/2006 | Work et al. |
| 2006/0075139 A1 | 4/2006 | Jungck |
| 2006/0085177 A1 | 4/2006 | Toyama et al. |
| 2006/0085419 A1 | 4/2006 | Rosen |
| 2006/0090122 A1 | 4/2006 | Pyhalammi et al. |
| 2006/0095540 A1 | 5/2006 | Anderson et al. |
| 2006/0101377 A1 | 5/2006 | Toyama et al. |
| 2006/0129675 A1 | 6/2006 | Toyama et al. |
| 2006/0143442 A1 | 6/2006 | Smith |
| 2006/0149464 A1 | 7/2006 | Chien |
| 2006/0155464 A1 | 7/2006 | Smartt |
| 2006/0156209 A1 | 7/2006 | Matsuura et al. |
| 2006/0161560 A1 | 7/2006 | Khandelwal et al. |
| 2006/0164238 A1 | 7/2006 | Karaoguz et al. |
| 2006/0173838 A1 | 8/2006 | Garg et al. |
| 2006/0178807 A1 | 8/2006 | Kato et al. |
| 2006/0190602 A1 | 8/2006 | Canali et al. |
| 2006/0200539 A1 | 9/2006 | Kappler et al. |
| 2006/0212217 A1 | 9/2006 | Sheha et al. |
| 2006/0224303 A1 | 10/2006 | Hayashi |
| 2006/0224773 A1 | 10/2006 | Degenaro et al. |
| 2006/0247844 A1 | 11/2006 | Wang et al. |
| 2006/0251292 A1 | 11/2006 | Gokturk et al. |
| 2006/0265125 A1 | 11/2006 | Glaza |
| 2006/0266830 A1 | 11/2006 | Horozov et al. |
| 2007/0005419 A1 | 1/2007 | Horvitz et al. |
| 2007/0006098 A1 | 1/2007 | Krumm et al. |
| 2007/0016663 A1 | 1/2007 | Weis |
| 2007/0038362 A1 | 2/2007 | Gueziec |
| 2007/0041393 A1 | 2/2007 | Westhead et al. |
| 2007/0064633 A1 | 3/2007 | Fricke |
| 2007/0064715 A1 | 3/2007 | Lloyd et al. |
| 2007/0088974 A1 | 4/2007 | Chandwani et al. |
| 2007/0100776 A1 | 5/2007 | Shah et al. |
| 2007/0118668 A1 | 5/2007 | McCarthy et al. |
| 2007/0127833 A1 | 6/2007 | Singh |
| 2007/0168208 A1 | 7/2007 | Aikas et al. |
| 2007/0203638 A1 | 8/2007 | Tooyama et al. |
| 2007/0226004 A1 | 9/2007 | Harrison |
| 2008/0004789 A1 | 1/2008 | Horvitz et al. |
| 2008/0004793 A1 | 1/2008 | Horvitz et al. |
| 2008/0016051 A1 | 1/2008 | Schiller |
| 2008/0016233 A1 | 1/2008 | Schneider |
| 2008/0052303 A1 | 2/2008 | Adler et al. |
| 2008/0059576 A1 | 3/2008 | Liu et al. |
| 2008/0071465 A1 | 3/2008 | Chapman et al. |
| 2008/0076451 A1 | 3/2008 | Sheha et al. |
| 2008/0086574 A1 | 4/2008 | Raciborski et al. |
| 2008/0098313 A1 | 4/2008 | Pollack |
| 2008/0201074 A1 | 8/2008 | Bleckman et al. |
| 2008/0201102 A1 | 8/2008 | Boettcher et al. |
| 2008/0214157 A1 | 9/2008 | Ramer et al. |
| 2008/0215237 A1 | 9/2008 | Perry |
| 2008/0228396 A1 | 9/2008 | Machii et al. |
| 2008/0228783 A1 | 9/2008 | Moffat |
| 2008/0235383 A1 | 9/2008 | Schneider |
| 2008/0268876 A1 | 10/2008 | Gelfand et al. |
| 2008/0270019 A1 | 10/2008 | Anderson et al. |
| 2008/0312822 A1 | 12/2008 | Lucas et al. |
| 2008/0319648 A1 | 12/2008 | Poltorak |
| 2008/0319660 A1 | 12/2008 | Horvitz et al. |
| 2008/0319974 A1 | 12/2008 | Ma et al. |
| 2009/0005987 A1 | 1/2009 | Vengroff et al. |
| 2009/0019181 A1 | 1/2009 | Fang et al. |
| 2009/0063646 A1 | 3/2009 | Mitnick |
| 2009/0070035 A1 | 3/2009 | Van Buer |
| 2009/0083128 A1 | 3/2009 | Siegel |
| 2009/0083237 A1 | 3/2009 | Gelfand et al. |
| 2009/0100018 A1 | 4/2009 | Roberts |
| 2009/0138188 A1 | 5/2009 | Kores et al. |
| 2009/0164516 A1 | 6/2009 | Svendsen et al. |
| 2009/0213844 A1 | 8/2009 | Hughston |
| 2009/0216435 A1 | 8/2009 | Zheng et al. |
| 2009/0216704 A1 | 8/2009 | Zheng et al. |
| 2009/0222581 A1 | 9/2009 | Josefsberg et al. |
| 2009/0228198 A1 | 9/2009 | Goldberg et al. |
| 2009/0239552 A1 | 9/2009 | Churchill et al. |
| 2009/0282122 A1 | 11/2009 | Patel et al. |
| 2009/0326802 A1 | 12/2009 | Johnson |
| 2010/0004997 A1 | 1/2010 | Mehta et al. |
| 2010/0010991 A1 | 1/2010 | Joshi |
| 2010/0027527 A1 | 2/2010 | Higgins et al. |
| 2010/0070171 A1 | 3/2010 | Barbeau et al. |
| 2010/0076968 A1 | 3/2010 | Boyns et al. |
| 2010/0082611 A1 | 4/2010 | Athsani et al. |
| 2010/0111372 A1 | 5/2010 | Zheng et al. |
| 2010/0153292 A1 | 6/2010 | Zheng et al. |
| 2010/0279616 A1 | 11/2010 | Jin et al. |
| 2010/0312461 A1 | 12/2010 | Haynie et al. |
| 2011/0022299 A1 | 1/2011 | Feng et al. |
| 2011/0029224 A1 | 2/2011 | Chapman et al. |
| 2011/0130947 A1 | 6/2011 | Basir |
| 2011/0173015 A1 | 7/2011 | Chapman et al. |
| 2011/0176000 A1 | 7/2011 | Budge et al. |
| 2011/0184949 A1 | 7/2011 | Luo |
| 2011/0191011 A1 | 8/2011 | McBride et al. |
| 2011/0191284 A1 | 8/2011 | Dalton |
| 2011/0208419 A1 | 8/2011 | Boss et al. |
| 2011/0280453 A1 | 11/2011 | Chen et al. |
| 2011/0282798 A1 | 11/2011 | Zheng et al. |
| 2011/0302209 A1 | 12/2011 | Flinn et al. |
| 2012/0030029 A1 | 2/2012 | Flinn et al. |
| 2012/0030064 A1 | 2/2012 | Flinn et al. |
| 2012/0150425 A1 | 6/2012 | Chapman et al. |
| 2012/0256770 A1 | 10/2012 | Mitchell |
| 2013/0166188 A1 | 6/2013 | Zheng et al. |
| 2014/0088791 A1 | 3/2014 | Alpert et al. |
| 2015/0186389 A1 | 7/2015 | Zheng et al. |
| 2016/0232179 A1 | 8/2016 | Zheng et al. |

FOREIGN PATENT DOCUMENTS

| | | |
|---|---|---|
| JP | 2002140362 A | 5/2002 |
| JP | 2002304408 A | 10/2002 |
| JP | 2003044503 A | 2/2003 |
| KR | 20050072555 A | 7/2005 |
| KR | 20060006271 A | 1/2006 |
| KR | 100650389 B1 | 11/2006 |
| WO | WO2006097907 A2 | 9/2006 |
| WO | WO2007087615 A | 8/2007 |
| WO | WO2007145625 A | 12/2007 |
| WO | WO2009053411 A1 | 4/2009 |
| WO | WO2010062726 A2 | 3/2010 |

OTHER PUBLICATIONS

Agrawal, et al., "Mining Sequential Patterns", retrieved on Aug. 4, 2009 at <<http://www.almaden.ibm.com/cs/projects/iis/hdb/Publications/papers/icde95.ps.gz>>, Proceedings of ICDE 1995, Mar. 1995, 12 pgs.

Aizawa, "Digitizing Personal Experiences: Capture and Retrieval of Life Log", at <<http://ieeexplore.ieee.org/iel5/9520/30168/

(56) References Cited

OTHER PUBLICATIONS 01385968.pdf?arnumber=1385968 >>, Proceedings of the 11th International Multimedia Modelling Conference (MMM'05), Jan. 2005, pp. 1 (abstract).

Allen, "Dredging-up the Past: Lifelogging, Memory and Surveillance", retrieved at <<http://lsr.nellco.org/cgi/viewcontent.cgi?article=1177&context=upenn/wps>>, University of Pennsylvania Law School, 2007, pp. 50.

Amato, et al., "Region Based Image Similarity Search Inspires by Text Search", Third Italian Research Conference on Digital Library Systems, Padova, Italy, Jan. 29-30, 2007, pp. 78-85.

Ashbrook, et al., "Using GPS to Learn Significant Locations and Predict Movement Across Multiple Users", Journal of Personal and Ubiquitous Computer Archive, vol. 7, Issue 5, Oct. 2003, 15 pages.

Belussi, et al, "Estimating the Selectivity of Spatial Queries Using the 'Correlation' Fractal Dimension", retrieved on Apr. 15, 2010 at <<http://www.vldb.org/conf/1995/P299.PDF>>, Proceedings of Conference on Very Large Data Bases (VLDB), Sep. 1995, pp. 299-310.

Borzsonyi, et al., The Skyline Operator, in Proc. ICDE 2001, IEEE Press: 421-430, <<http://ieeexplore.ieee.org/stamp/stamp.jsp?tp=&arnumber=914855>>.

Brkic, et al., Generative modeling of spatio-temporal traffic sign trajectories, Proceedings of the IEEE Conference on Computer Vision and Pattern Recognition, 2010, pp. 25-31, <<http://www.zemris.fer.hr/~ssegvic/pubs/brkic1Oucvp.pdf>>.

Brunato, Battiti, "A Location-Dependent Recommender System for the Web", retrieved on Dec. 29, 2009 at <<http://dit.unitn.it/~brunato/pubblicazioni/MobEA.pdf>>, MobEA Workshop, Budapest, May 2003, pp. 1-5.

Chan, et al, "Efficient Time Series Matching by Wavelets", retrieved on Apr. 15, 2010 at <<http://infolab.usc.edu/csci599/Fall2003/Time%20Series/Efficient%20Time%20Series%20Matching%20by%20Wavelets.pdf>>, IEEE Computer Society, Proceedings of Conference on Data Engineering (ICDE), Mar. 1999, pp. 126-133.

Chen et al., "GeoTV: Navigating Geocoded RSS to Create an IPTV Experience", Proceedings of the 16th International World Wide Web Conference (WWW 2007), Banff, Alberta, Canada, May 8-12, 2007, pp. 1323-1324, retrieved Apr. 30, 2010 at <<http://www2007.org/posters/poster1042.pdf>>.

Chen, et al, "On the Marriage of Lp-norms and Edit Distance", retrieved on Apr. 15, 2010 at <<http://www.google.co.in/url?sa=t&source=web&cd=3&ved=0CBEQFjAC&url=http%3A%2F%2Fciteseerx.ist.psu.edu%2Fviewdoc%2Fdownload%3Fdoi%3D10.1.1.1.7443%26rep%3Drep1%26type%3Dpdf&rct=j&q=On+the+marriage+of+lp-norms+and+edit+distance&ei=_ezGS62IE439_Aa1qlzZDA&usg=AFQjCNHFZScVkE4uy1b_oC-Pr4ur7KIBdQ>>, Proceedings of Conference on Very Large Data Bases (VLDB), Aug. 29-Sep. 3, 2004, pp. 792-803.

Chen et al., "Searching Trajectories by Locations—An Efficiency Study", 2010 Microsoft Research, to be presented at the ACM Conference on Management of Data (SIGMOD), Indianapolis, Indiana, Jun. 6-11, 2010, 12 pages, retrieved on Apr. 16, 2010 at <<http://www.itee.uq.edu.au/~zxf/_papers/sigmod299-chen.pdf>>.

Cranshaw, et al., Bridging the Gap between the Physical Location and Online Social Networks, In Proc. Ubicomp 2010, ACM Press (2010), <<http://www.eng.tau.ac.il/~eran/papers/Cranshaw_Bridging_the_Gap.pdf>>.

Domain Name System (DNS) A Guide to TCP/IP, retrieved on Apr. 29, 2008 at <<http://web.syr.edu/~djmolta/ist452/ch_07.ppt>>, Thomson Learning Course Technology, pp. 1-56.

The European Search Report mailed Nov. 21, 2012 for European Patent Application No. 09714738.3, 9 pages.

The European Search Report mailed Jun. 8, 2012 for European patent application No. 09715263.01, 6 pages.

Estivill-Castro et al, "Data Mining Techniques for Autonomous Exploration of Large Volumes of Geo-referenced Crime Data", 6th International Conference on GeoCom.putation, University of Queensland, Brisbane, Australia, Sep. 24-26, 2001, 12 pages.

Faloutsos et al, "Fast Subsequence Matching in Time-Series Databases," Proceedings of the 1994 ACM SIGMOD International Conference on Management of Data , vol. 23, No. 2, Jun. 1994, 11 pgs.

"Global Server Load Balancing for Disaster Recovery, Business Continuity, Performance Optimization and Datacenter Management ", Zeus Technology Limited, retrieved at <<http://www.zeus.com/documents/en/ZXT/ZXTM_Global_Load_Balancer.pdf>>, Zeus Technology Limited, 1995-2007, 4 pgs.

"GPS-Waypoints", retrieved on Apr. 15, 2010 at <<http://www.gps-waypoints.net/>>, 2010, pp. 1.

Gustavsen, "Condor—an application framework for mobility-based context-aware applications", retrieved on Aug. 4, 2009 at <<http://www.comp.lancs.ac.uk/~dixa/conf/ubicomp2002-models/pdf/Gustavsen-goteborg%20sept-02.pdf>>, UBICOMP 2002, 2002, pp. 1-6.

Guttman, "R-Trees: A Dynamic Index Structure for Spatial Searching", retrieved on Apr. 15, 2010 at <<http://www.google.co.in/url?sa=t&source=web&ct=res&cd=1&ved=0CAcQFjAA&url=http%3A%2F%2Fciteseerx.ist.psu.edu%2Fviewdoc%2Fdownload%3Fdoi%3D10.1.1.66.1675%26rep%3Drep1%26type%3Dpdf&rct=j&q=R-trees%3A+a+dynamic+index+structure+for+spatial+searching&ei=JfTGS6uRPJH0_AaCpICHDQ&usg=AFQjCNFtQttNVHCKYJQZcH052-KmCxlZ0g>>, ACM, Proceedings of Conference on Management of Data,1984, pp. 47-57.

Jarvelin et al, "Cumulated Gain Based Evaluation of IR Techniques", ACM Transactions on Information Systems, vol. 20, No. 4, Oct. 2002, pp. 422-446.

Korn, Pagel, Faloutsos, "On the 'Dimensionality Curse' and the 'Self-Similarity Blessing'", retrieved on Apr. 15, 2010 at <<http://www.informedia.cs.cmu.edu/documents/korn_dimcurse_2001.pdf>>, IEEE Educational Activities Department, Transactions on Knowledge and Data Engineering, vol. 13, No. 1, Jan. 2001, pp. 96-111.

Lee, et al., "Trajectory Clustering: A Partition-and-Group Framework", retrieved on Aug. 4, 2009 at <<http://www.cs.uiuc.edu/homes/hanypdf/sigmod07_jglee.pdf>>, ACM, SIGMOD 2007, 2007, pp. 1-12.

Liao et al., "Learning and Inferring Transportation Routines", American Association for Artificial Intelligence Press (AAAI) 19th National Conference on Artificial Intelligence, San Jose, California, Jul. 25-29, 2004, pp. 348-353, retrieved on Apr. 16, 2010 at <<http://www.cs.rochester.edu/~kautz/papers/gps-tracking.pdf>>.

Linden, "The End of Federated Search?", at <<http://glinden.blogspot.com/2007/03/end-of-federated-search.html>>, Mar. 24, 2007, pp. 9.

Office action for U.S. Appl. No. 12/712,857, mailed on Feb. 21, 2014, Zheng, et al., "Map-Matching for Low-Sampling-Rate GPS Trajectories", 15 pages.

Office Action for U.S. Appl. No. 12/712,857, mailed on Aug. 5, 2013, Zheng, et al., "Map-Matching for Low-Sampling-Rate GPS Trajectories", 15 pages.

Office Action for U.S. Appl. No. 13/324,758, mailed on Jan. 18, 2013, Zheng et al., "Urban Computing of Route Oriented Vehicles", 48 pages.

Office action for U.S. Appl. No. 12/794,538, mailed on Nov. 19, 2012, Zheng et al. "Searching Similar Trajectories by Locations", 10 pages.

Office Action for U.S. Appl. No. 12/353,940, mailed on Feb. 28, 2013, Zheng et al., "Detecting Spatial Outliers in a Location Entity Dataset", 9 pages.

Office action for U.S. Appl. No. 12/794,538, mailed on Apr. 22, 2014, Zheng et al., "Searching Similar Trajectories by Locations", 38 pages.

Office Action for U.S. Appl. No. 13/324,758, mailed on Jul. 11, 2013, Zheng et al., "Urban Computing of Route-Oriented Vehicles", 47 pages.

Park, et al., "CoDNS: Improving DNS Performance and Reliability via Cooperative Lookups," retrieved at <<http://www.cs.princeton.

(56) References Cited

OTHER PUBLICATIONS edu/nsg/papers/codns_osdi_04/paper.pdf>>, Princeton University, OSDI'04: Proceedings of the 6th conference on Symposium on Opearting Systems Design \& Implementation, Dec. 2004, pp. 1-16.
Patterson, et al., "Inferring High-Level Behavior from Low-Level Sensors", retrieved on Aug. 4, 2009 at <<http://www.cs.rochester.edu/u/kautz/papers/High-Level-140.pdf>>, UBICOMP 2003, 2003, pp. 1-18.
Rosenfeld, Connectivity in digital pictures. Journal of the ACM (JACM), 17(1):160, 1970.
Saltenis, "Outlier Detection Based on the Distribution of Distances between Data Points", retrieved on Dec. 12, 2008 at <<http://www.mii.lt/informatica/pdf/INFO558.pdf>>, INFORMATICA, vol. 15, No. 3, 2004, pp. 399-410.
Sellen, et al., "Do Life-Logging Technologies Support Memory for the Past? An Experimental Study Using SenseCam", available at least as early as Nov. 16, 2007, at <<http://research.microsoft.com/sds/papers/SensecamMemCHICamRdy.pdf>>, pp. 10.
Shekhar et al., "A Unified Approach to Detecting Spatial Outliers", GeoInformatica, 7:2, Jun. 2003, pp. 139-166.
Sun, "Outlier Detection in High Dimensional, Spatial and Sequential Data Sets", School of Information Technologies, The University of Sydney, Sep. 2006, 118 pages.
Vlachos, Kollios, Gunopulos, "Discovering Similar Multidimensional Trajectories", retrieved on Apr. 15, 2010 at <<http://www.google.co.in/url?sa=t&source=web&cd=1&ved=0CAcQFjAA&url=http%3A%2F%2Fciteseerx.ist.psu.edu%2Fviewdoc%2Fdownload%3Fdoi%3D10.1.1.106.1984%26rep%3Drep1%26type%3Dpdf&rct=j&q=Discovering+similar+multidimensional+trajectories&ei=ivfGS6HCM4uj_ga3wOiBDQ&usg=AFQjCNG20j6K3s_WuY-VhWeDjIPYpgxv1Q>>, IEEE Computer Society, Proceedings of Conference on Data Engineering (ICDE), 2002, pp. 673-684.
Wasinger, et al., "M3I in a Pedestian Navigation & Exploration System", Proceedings of the Fifth International Symposium on Human Computer Interaction with Mobile Devices, Sep. 2003, 5 pages.
Winogard, "Dynamic Cartograms for Navigating Geo-referenced Photographs", available at least as early as Nov 16, 2007, at <<http://cs.stanford.edu/research/project.php?id=289>>, pp. 2.
Yan, et al., "Clospan: Mining Closed Sequential Patterns in Large Datasets", retrieved on Aug. 4, 2009 at <<http://citeseerx.ist.psu.edu/viewdoc/download;jsessionid=AFADA02A222CC497F30CEC7317F6C7A5?doi=10.1.1.12.3538&rep=rep1&type=pdf>>, Proceedings of SIAM Int. Conference on Data Mining, SDM 2003, 2003, pp. 166-177.
Zheng et al., "Collaborative Filtering Meets Mobile Recommendation: A User-centered Approach", to be presented at the Association for the Advancement of Artificial Intelligence (AAAI) 24th Conference on Artificial Intelligence, Atlanta, Georgia, Jul. 11-15, 2010, 6 pages., retrieved on Apr. 16, 2010 at <<http://research.microsoft.com/pubs/122244/AAAI10-Collaborative%20Filtering%20Meets%20Mobile%20Recommendation%20A%20User-centered%20Approach.pdf>>.
Zheng, et al., GeoLife: A Collaborative Social Networking Service among User, Location and Trajectory. IEEE Date Engineer Bulletin, 33(2). IEEE press 2010, 32-40, <<http://sites.computer.org/debull/A10june/geolife.pdf>>.
Zheng, et al., "GeoLife: Managing and Understanding Your Past Life over Maps", IEEE Computer Society, In the Proceedings of the Ninth International Conference on Mobile Data Management, 2008, pp. 211-212, 2 pgs.
Zheng, et al., Recommending friends and locations based on individual location history. In ACM Transaction on the Web, 2011, 44 pages, <<http://research.microsoft.com/pubs/122435/RecomFriend-zheng-Published.pdf>>.
Zheng et al., "Recommending Friends and Locations Based on Individual Location History", ACM Trans. Asian Language Information Processing, vol. 6, No. 3, Article 9, Ch. 45, Nov. 2007, 47 pages, retrieved on Apr. 16, 2010 at <<http://research.microsoft.com/pubs/122435/Recommending%20friends%20and%20locations%20based%20on%20individual%20location%20history.pdf>>.
Zheng, et al., T-Drive: Driving Directions based on Taxi Trajectories, In Proc. ACM SIGSPATIAL GIS 2010. ACM Press , 2010, 10 pages, <<http://www.cse.unt.edu/~huangyan/6350/paperList/T-Drive.pdf>>.
Office action for U.S. Appl. No. 12/712,857, mailed on Jan. 6, 2015, Zheng, et al., "Map-Matching for Low-Sampling-Rate GPS Trajectories", 15 pages.
Office action for U.S. Appl. No. 12/712,053, mailed on Mar. 10, 2015, Zheng et al., "Route Computation Based on Route-Oriented Vehicle Trajectories", 22 pages.
Office action for U.S. Appl. No. 12/794,538, mailed on Mar. 23, 2015, Zheng et al., "Searching Similar Trajectories by Locations", 8 pages.
Office action for U.S. Appl. No. 13/324,758, mailed on Jun. 17, 2015, Zheng et al., "Urban Computing of Route-Oriented Vehicles", 38 pages.
Office action for U.S. Appl. No. 14/659,125, mailed on Jun. 19, 2015, Inventor #1, "Recommending Points of Interests in a Region", 7 pages.
Office action for U.S. Appl. No. 12/712,857, mailed on Jun. 25, 2015, Inventor #1, "Map-Matching for Low-Sampling-Rate GPS Trajectories", 17 pages.
Final Office Action for U.S. Appl. No. 12/712,857, mailed on Oct. 7, 2015, Yu Zheng, "Map-Matching for Low-Sampling-Rate GPS Trajectories", 18 pages.
Office action for U.S. Appl. No. 12/794,538, mailed on Aug. 14, 2015, Zheng et al., "Searching Similar Trajectories by Locations", 10 pages.
Agarwal, et al., "Geometric Approximation via Coresets," Combinatorial and Computational Geometry, MSRI Publications, vol. 52, 2005, 30 pages.
Agrawal, et al., "Efficient Similarity Search in Sequent Databases," IBM Almaden Research Center, San Jose, California, 4th International Conference, Oct. 1993, 15 pages.
Blandford, Rafe, "Looking at Lifeblog," retrieved at <<http://www.allaboutsymbian.com/features/item/Looking_at_Lifeblog.php>>, Oct. 18, 2004, 14 pages.
Carter, et al., "When Participants Do the Capturing: The Role of Media in Diary Studies," CHI '05 Proceedings of the SIGCHI Conference on Human Factors in Computing Systems, Apr. 2005: 899-908, 10 pages.
Chakka, et al., "Indexing Large Trajectory Data Sets With SETI," Proceedings of the 2003 CIDR Conference, Jan. 2003, pp. 1-12.
Dumais, et al., "Stuff I've Seen: A System for Personal Information Retrieval and Re-Use," SIGIR, Aug. 1, 2003, pp. 1-8.
Flickr. http://www.flickr.com/, retrieved on Jan. 18, 2008, 1 pages.
Freeman, Eric, "Lifestreams: A Storage Model for Personal Data," SIGMOD Record, vol. 25, No. 1, Mar. 1996, pp. 80-86.
Fu, et al., "Heuristic shortest path algorithms for transportation applications: State of the art," Science Direct, Computers & Operations Research 33 (2006) 3324-3343, available May 3, 2005; pp. 3324-3343.
Geek Magazine, "LifeLog: DARPA looking to record lives of interested parties," retrieved at <<http://www.geek.com/news/lifelog-darpa-looking-to-record-lives-of-interested-parties-552879/>>, retrieved on Sep. 23, 2013, published on Jun. 3, 2003, 4 pages.
Gemmell, et al., "MyLifeBits: A Personal Database for Everything," Microsoft Bay Area Research Center, MSR-TR-2006-23, Feb. 20, 2006, pp. 1-18.
GeoLife GPS Trajectories, <<http://research.microsoft.com/en-us/downloads/b16d359d-d164-469e-9fd4-daa38f2b2e13/default.aspx. Aug. 2012, 5 pages.
Hadjieleftheriou, et al., "Indexing Spatio-temporal Archives," Proceedings of Extending Database Technology 2002, Mar. 2002, pp. 1-22.
Hanlon, Mike, "Nokia Lifeblog is an automated multimedia diary," retrieved at <<http://www.gizmag.com/go/2729/>>, Jun. 4, 2004, 5 pages.

(56) References Cited

OTHER PUBLICATIONS

International Preliminary Report on Patentability for PCT Application No. PCT/US2009,032774, mailed on Sep. 10, 2010. 6 pages.
International Search Report and the Written Opinion for PCT Application No. PCT/US2009/032778, mailed on Aug. 19, 2009, 11 pgs.
Kim et al., "A Spatiotemporal Data and Indexing," Proceedings of IEEE Region 10 International Conference on Electrical and Electronic Technology, Singapore, Aug. 19-22, 2001, pp. 110-113.
Klemmer, et al., "Where Do Web Sites Come From? Capturing and Interacting with Design History," CHI, Contextual Displays Paper, Apr. 20-25, 2002, vol. 4, No. 1, pp. 1-8.
Kollios, et al., "Indexing Animated Objects Using Spatiotemporal Access Methods," A TimeCenter Technical Report, TR-54, Jan. 25, 2001, pp. 1-32.
Kolovson et al., "Segment Indexes: Dynamic Indexing Techniques for Multi-Dimensional Interval Data," Proceedings of the ACM SIGMOD Conference on Management of Data, May 1991, pp. 138-147, 10 pages.
Kuechne et al., "New Approaches for Traffic Management in Metropolitan Areas," In 10th IFAC Symposium on Control in Transportation Systems, Aug. 2003, 9 pages.
Kumar, et al., "Approximate Minimum Enclosing Balls in High Dimensions Using Core-Sets," Journal of Experimental Algorithmics (JEA), vol. 8, Apr. 2003, Artl. No. 1.1, pp. 1-29.
Kumar, et al., "Designing Access Methods for Bitemporal Databases," IEEE Trans. Knowl. Data Eng., Jan. 1998, pp. 1-41.
Lou, et al., "Map-Matching for Low-Sampling-Rate GPS Trajectories," ACM GIS '09, ISBN 978-1-60558-649, Nov. 4-6, 2009, pp. 1-10.
Mead, Nick, "Lifeblog 2.5," retrieved at <<http://lifeblog.en.softonic.com/symbian>>, Feb. 25, 2008, 2 pages.
Mountain Bike. http://www.mtb-tracks.co.uk/northyorkmoors/default.aspx, retrieved Jan. 18, 2008, 2 pages.
Nascimento, et al., "Evaluation of Access Structures for Discretely Moving Points", Proceedings of the International Workshop on Spatio-Temporal Database Management, Sep. 1, 1998, State Univ. of Campinas, Brazil, 18 pp.
Nascimento et al., "Towards historical R-trees," Proc. of the ACM Symp. on Applied Computing, SAC, pp. 235-240, Feb. 1998, 6 pages.
Notice to File Corrected Application Papers U.S. Appl. No. 12/794,538, mailed on Mar. 11, 2010, Zheng et al. "Mining Correlation Between Locations Using Location History", 2 pages.
Office Action for U.S. Appl. No. 13/195,496, mailed on Oct. 21, 2011, Yu Zheng, "Learning Transportation Modes from Raw GPS Data ", 7 pages.
Office Action for U.S. Appl. No. 12/037,263, mailed on Oct. 8, 2010, Longhao Wang, "Indexing Large-Scale GPS Tracks", 12 pages.
Office action for U.S. Appl. No. 13/324,758, mailed on Feb. 26, 2016, Zheng et al., "Urban Computing of Route-oriented Vehicles", 32 pages.
Office Action for U.S. Appl. No. 13/195,496, mailed on Feb. 7, 2012, Yu Zheng, "Learning Transportation Modes from Raw GPS Data ", 7 pages.
Office Action for U.S. Appl. No. 12/037,347, mailed on Mar. 1, 2011, Zheng, et al., System for Logging Life Experiences Using Geographic Cues, 18 pages.
Office action for U.S. Appl. No. 12/794,538, mailed on Mar. 2, 2016, Zheng et al., "Searching Similar Trajectories by Locations", 10 pages.
Dffice Action for U.S. Appl. No. 12/037,263, mailed on Mar. 29, 2011, Longhao Wang, "Indexing Large-Scale GPS Tracks", 8 pages.
Office Action for U.S. Appl. No. 12/712,857, mailed on May 20, 2016, Yu Zheng, "Map-Matching for Low-Sampling-Rate GPS Trajectories", 14 pages.
International Preliminary Report on Patentability for PCT Application No. PCT/US2009/032778, mailed on Aug. 19, 2009, 5 pages.

Office Action for EP Patent Application No. 09 715 2611, mailed on Feb. 16, 2015, "Learning Transportation Modes from Raw GPS Data", 5 pages.
Office Action mailed Oct. 9, 2015 for European Patent Application No. 09 715 2611, 4 pages.
Papadopoulos et al., "Performance of Nearest Neighbor Queries in R-Trees", In ICDT, Jan. 1997, pp. 394-408.
Rao et al., "Making B+-tree Cache Sensitive in Main Memory," Proceedings of ACM SIGMOD Conference, May 2000, pp. 475-486, 12 pages.
Salzberg et al., "Comparison of Access Methods for Time-Evolving Data", ACM Computing Surveys, 31(2), Jun. 1999, pp. 158-221, 64 pages.
Shachtman, Noah, "A Spy Machine of DARPA's Dreams," retrieved at <<http://archive.wired.com/techbiz/media/news/2003/05/58909?currentPage=all>>, Wired, May 20, 2003, 1 page.
Shachtman, Noah, "Pentagon Kills Lifelog Project," retrieved at <<http://www.wired.com/2004/02/pentagon-kills-ifelog-project/>>, Wired, Feb. 4, 2004, 6 pages.
Song et al., "Hashing Moving Objects," Proceedings of 2nd International Conference of Mobile Data Management, May 2001, pp. 1-31.
Song et al., "SEB-tree: An Approach to Index Continuously Moving Objects," Proceedings of International Conference of Mobile Data Management, pp. 340-344, Jan. 2003.
Supplemental EP Search Report App. No. 09713700.4 mailed Jul. 17, 2012, 9 pages.
Tao et al., "MV3R-Tree: A Spatio-Temporal Access Method for Timestamp and Interval Queries," Proceedings of the International Conference on Very Large Data Bases, Sep. 2001, 10 pages.
Theodoridis et al., "On the Generation of Spatiotemporal Datasets," Advances in Spatial Databases, 6th International Symposium, Lecture Notes in Computer Science, Springer, Jan. 1999, 19 pages.
Wang et al., "A Flexible Spatio-Temporal Indexing Scheme for Large-Scale GPS Track Retrieval," MDM '08 9th International Conference on Mobile Data Management, IEEE, Beijing, 8 pages.
Weeks, Darren, "LifeLog: Because Big Brother Cares What You're Thinking," retrieved at <<http://www.sweetliberty.org/issues/privacy/lifelog.htm>> on Dec. 3, 2005, Big Brother, 5 pages.
Wikipedia, "DARPA LifeLog," retrieved at <<https://en.wikipedia.orgiwiki/DARPA_LifeLog>>, Dec. 14, 2013, 1 page.
Wikipedia, "Nokia Lifeblog", retrieved at <<https://en.wikipedia.orgiwiki/Nokia_Lifeblog>>, on Feb. 26, 2008, 2 pages.
Wyatt et al., "Unsupervised Activity Recognition Using Automatically Mined Common Sense", American Association for Artificial Intelligence (AAAI 2005), Proceedings of the 20th National Conference on Artificial Intelligence, Pittsburgh, Pennsylvania, Jul. 9-13, 2005, pp. 21-27, 7 pages.
Xu et al., "RT-Tree: An Improved R-Tree Indexing Structure for Temporal Spatial Databases," Proc. of the Intl. Symp. on Spatial Data Handling, SDH, pp. 1040-1049, Jul. 1990, 5 pages.
Yuan et al., "An Interactive-Voting Based Map Matching Algorithm," In IEEE Conference on Mobile Data Management (MDM), 2010, 10 pages.
Zheng, et al., "Collaborative Location and Activity Recommendations with GPS History Data," Proceedings of the 19th International Conference on World Wide Web, 2010, pp. 1029-1038.
Zheng et al., "Cross-domain Activity Recognition," In Proc. of the 11th International Conference on Ubiquitous Computing (Orlando, USA, 2009), ACM Press, pp. 61-70.
Zheng et al., "Understanding Transportation Modes Based on GPS Data for Web Applications," ACM Transactions on the Web, 4(1):1-36, 2010.
Zhou et al., "Close Pair Queries in Moving Object Databases," Proceedings of ACM GIS, pp. 2-11, 2005, 10 pages.
Office Action for U.S. Appl. No. 13/324,758, mailed on Jul. 13, 2016, Zheng et al., "Urban Computing of Route-Oriented Vehicles", 7 pages.
Office action for U.S. Appl. No. 12/794,538, mailed on Aug. 2, 2016, Zheng et al. "Searching Similar Trajectories by Locations", 7 pages.
Abowd et al., "Cyberguide: A mobile context-aware tour guide", Wireless Networks, vol. 3, retrieved on Apr. 30, 2010 at <<http://

(56) References Cited

OTHER PUBLICATIONS graphics.cs.columbia.edu/courses/mobwear/resources/p421-abowd-97.pdf>>, Oct. 1997, pp. 421-433.

Adomavicius, Tuzhilin, "Toward the Next Generation of Recommender Systems: A Survey of the State-of-the-Art and Possible Extensions", retrieved on Dec. 29, 2009 at <<http://www.inf.unibz.it/~ricci/ATIS/papers/state-of-the-art-2005.pdf>>, IEEE Transactions on Knowledge and Data Engineering, vol. 17, No. 6, Jun. 2005, pp. 734-749.

Agrawal, et al., "Mining Association Rules between Sets of Items in Large Databases", retrieved on Aug. 4, 2009 at <<http://rakesh.agrawal-family.com/papers/sigmod93assoc.pdf>>, ACM, Proceedings of SIGMOD 1993, Jun. 1993, pp. 207-216.

Agrawal, et al., "Mining Sequential Patterns", retrieved on Aug. 4, 2009 at <<http://www.almaden.ibm.com/cs/projects/iis/hdb/Publications/papers/icde95.gs.gz>>, Proceedings of ICDE 1995, Mar. 1995, 12 pgs.

Ahern, et al., "World Explorer: Visualizing Aggregate Data From Unstructured Text in Geo-Referenced Collections", In the Proceedings of the 7th ACM/IEEE-CS Joint Conference on Digital Libraries, 2007, pp. 1-10.

Aizawa, et al., "Capture and Efficient Retrieval of Life Log", available at least as early as Nov 16, 2007, at <<http://www.ii.ist.i.kyoto-u.ac.jp/~sumi/pervasive04/program/Aizawa.pdf>>, In Pervasive 2004 Workshop on Memory and Sharing of Experiences, Apr. 2004, 6 pgs.

Aizawa, "Digitizing Personal Experiences: Capture and Retrieval of Life Log", at <<http://ieeexplore.ieee.org/iel5/9520/30168/01385968.pdf?arnumber=1385968 >>, Proceedings of the 11th International Multimedia Modelling Conference (MMM'05), Jan. 2005, p. 1 (abstract).

Allen, "Dredging-up the Past: Lifelogging, Memory and Surveillance", retrieved at <<http://lsr.nellco.org/cgi/viewcontent.cgi?article=1177&context=upenn/wps>>, University of Pennsylvania Law School, 2007, p. 50.

Amato, et al., "Region Based Image Similarity Search Inspired by Text Search", Third Italian Research Conference on Digital Library Systems, Padova, Italy, Jan. 29-30, 2007, pp. 78-85.

Ankerst et al., "OPTICS: Ordering Points to Identify the Clustering Structure", Proceedings of the ACM SIGMOD 1999 International Conference on Management of Data, Philadelphia, Pennsylvania, retrieved Apr. 30, 2010 at <<http://www.dbs.informatik.uni-muenchen.de/Publicationen/Papers/OPTICS.pdf>>, Jun. 1-3, 1999, 12 pages.

Askbrook, et al., "Using GPS to Learn Significant Locations and Predict Movement Across Multiple Users", Journal of Personal and Ubiquitous Computer Archive, vol. 7, Issue 5, Oct. 2003, 15 pages.

Belussi, et al, "Estimating the Selectivity of Spatial Queries Using the 'Correlation' Fractal Dimension", retrieved on Apr. 15, 2010 at <<http://www.vldb.org/conf/1995/P299.PDF>>, Proceedings of Conference on Very Large Data Bases (VLDB), Sep. 1995, pp. 299-310.

"Bikely Reviews", website, 2010, 1 page, retrieved on Apr. 16, 2010 at <<http://www.bikely.com/>>.

bing.com, Maps, Retrieved on Dec. 28, 2009 at <<http://cn.bing.com/ditu/>>, 2 pgs.

Bohm, "A Cost Model for Query Processing in High Dimensional Data Spaces", retrieved on Apr. 15, 2010 at <<http://www.dbs.informatik.uni-muenchen.de/~boehm/publications/tods-modeling.final.pdf, ACM Transactions on Database Systems, Jun. 2000, pp. 1-43.

Borzsonyi, et al., The Skyline Operator, In Proc. ICDE 2001, IEEE Press: 421-430, <<http://ieeexplore.ieee.org/stamp/stamp.jsp?tp=&arnumber=914855.

Brakatsoulas, et al., "On Map-Matching Vehicle Tracking Data", VLDB Endowment, In the Proceedings of the 31st International Conference on Very Large Data Bases, Sep. 2005, pp. 853-864.

Brauckhoff, et al., Applying PCA for Traffic Anomaly Detection: Problems and Solutions, IEEE, 2009, 5 pages.

Breiman, "Bagging Pedictors", Machine Learning, vol. 24, No. 2, Aug. 1996, pp. 123-140.

Brkic, et al., Generative modeling of spatio-temporal traffic sign trajectories, Proceedings of the IEEE Conference on Computer Vision and Pattern Recognition, 2010, pp. 25-31, <<http://www.zemris.fer.hr/~ssegvic/pubs/brkic10ucvp.pdf>>.

Brunato, Battiti, "A Location-Dependent Recommender System for the Web", retrieved on Dec. 29, 2009 at <<http://dit.unitn.it/~brunato/pubblicazioni/MobEA.pdf, MobEA Workshop, Budapest, May 2003, pp. 1-5.

Bu, et al., Efficient Anomaly Monitoring Over Moving Object Trajectory Streams, KDD 2009, ACM, 2009, 9 pages.

Cai, "Indexing Spatio-Temporal Trajectories with Chebyshev Polynomials", retrieved on Apr. 15, 2010 at <<http://www.cs.ubc.ca/~rng/psdepository/sigmod2004.pdf>>, ACM, Conference on Management of Data, Jun. 13-18, 2004, pp. 599-610.

Cao, et al., Mining Frequent Spatio-temporal Sequential Patterns, Proceedings of the 5th IEEE International Conference on Data Mining 2005, pp. 82-89, 2005.

Chan, et al, "Efficient Time Series Matching by Wavelets", retrieved on Apr. 15, 2010 at <<http://infolab.usc.edu/csci599/Fall2003/Time%20Series/Efficient%20Time%20Series%20Matching%20by%20Wavelets.pdf>>, IEE Computer Society, Proceedings of Conference on Data Engineering (ICDE), Mar. 1999, pp. 126-133.

Chawathe, "Segment-Based Map Matching", In the Proceedings of the IEEE Intelligent Vehicles Symposium, Jun. 13-15, 2007, pp. 1190-1197.

Chen et al., "GeoTV: Navigating Geocoded RSS to Create an IPTV Experience", Proceedings of the 16th International World Wide Web Conference (WWW 2007), Banff, Alberta, Canada, May 8-12, 2007, pp. 1323-1324, retrieved Apr. 30, 2010 at <<http://www.2007.org/posters/poster1042.pdf>>.

Chen, et al., "GeoTracker Geospatial and Temporal RSS Navigation", WWW2007, May 2007, pp. 41-50.

Chen, et al., GLS-SOD: A Generalized Local Statistical Approach for Spatial Outlier Detection, Proceedings of KDD 2010, ACM, 2010, pp. 1069-1078.

Chen, et al, "On the Marriage of Lp-norms and Edit Distance", retrieved on Apr. 15, 2010 at <<http://www.google.co.in/url?sa=t&source=web&ct=res&cd=3&ved=0CBEQFjAC&url=http%3A%2F%2Fciteseerx.ist.psu.edu%2Fviewdoc%2Fdownload%3Fdoi%3D10.1.1.1.7443%26rep%3Drep1%26type%3Dpdf&rct=j&q=On+the+marriage+of+lp-norms+and+edit+distance&ei=_ezGS62IE439_Aa1qlzZDA&usg=AFQjCNHFZScVkE4uy1b_oC-Pr4ur7KIBdQ>>, Proceedings of Conference on Very Large Data Bases (VLDB), Aug. 29-Sep. 3, 2004, pp. 792-803.

Chen, et al., Robust and Fast Similarity Search for Moving Object Trajectories, Proceedings of SIGMOD 2005, 12 pages, 2005 ACM.

Chen et al., "Searching Trajectories by Locations—An Efficiency Study", 2010 Microsoft Research, to be presented at the ACM Conference on Management of Data (SIGMOD), Indiananpolis, Indiana, Jun. 6-11, 2010, 12 pages, retrieved on Apr. 16, 2010 at <<http://www.itee.uq.edu.au/~zxf/_papers/sigmod299-chen.pdf>>.

Cranshaw, et al., Bridging the Gap between the Physical Location and Online Social Networks, In Proc. Ubicomp 2010, ACM Press (2010), <<http://www.eng.tau.ac.il/∞eran/papers/Cranshaw_Bridging_the_Gap.pdf>>.

"CRF++: Yet Another CRF Toolkit", retrieved on Jan. 18, 2008 from <<http://crfpp.sourceforge.net>>, 13 pages.

Das, et al., Anomaly Detection and Spatial-Temporal Analysis of Global Climate System, Proceedings of SensorKDD 2009, 9 pages, 2009 ACM.

Datta, et al., "Image Retrieval: Ideas, Influences, and Trends of the New Age", ACM Computing Surveys, vol. 40, No. 2, Article 5, Apr. 2008, pp. 1-60.

Deerwester, et al., "Indexing by Latent Semantic Analysis", J. Amer. Soc. Info. Sci., vol. 41, No. 6, Jan. 1990, 34 pages.

Ding et al, "Querying and Mining of Time Series Data: Experimental Comparison of Representations and Distance Measures",

(56) References Cited

OTHER PUBLICATIONS retrieved on Apr. 15, 2010 at <<http://www.vldb.org/pvldb/1/1454226.pdf>>, VLDB Endowment, PVLDB'08, Aug. 23-28, 2008, pp. 1542-1552.
8.10 Domain Name System (DNS), retrieved on Apr. 29, 2008 at <<http://www.unix.org.ua/orelly/networking/firewall/ch08_10.htm>>, Unix, pp. 1-11.
Domain Name System (DNS) A Guide to TCP/IP, retrieved on Apr. 29, 2008 at <<http://web.syredu/~djmolta/ist452/ch_07.ppt>>, Thomson Learning Course Technology, pp. 1-56.
Dubuisson et al., "A Modified Hausdorff Distance for Object Matching", Proceedings of the 12th Iapr International Conference on Pattern Recognition, Computer Vision & Image Processing, vol. 1, Oct. 9-13, 1994, pp. 566-568.
Eagle, et al., Community Computing: Comparisons between Rural and Urban Societies using Mobile Phone Data, IEEE Social Computing, 144-150, <<http://reality.media.mit.edu/pdfs/Eagle_community.pdf>>.
Eagle, et al., Reality mining: sensing complex social systems. Personal Ubiquitous Computing, 10, 4: 255-268, 2006. <<http://robotics.usc.edu/~sameera/CS546/readings/eagle_uc2006.pdf>>.
Eagle et al, "Reality mining: sensing complex social systems", Springer-Verlag London, Personal and Ubiquitous Computing, vol. 10, Issue 4, Mar. 2006, pp. 255-268.
European Search Report mailed Nov. 21, 2012 for European Patent Application No. 09714738.3, 9 pages.
European Search Report mailed Jun. 8, 2012 for European patent application No. 09715263.01, 6 pages.
Espinoza et al, "GeoNotes: Social and Navigational Aspects of Location-Based Information Systems", Proc Ubicomp 3rd Intl Conf on Ubiquitous Computing, Oct. 2001, LNCS 2201, pp. 2-17.
Estivill-Castro et al, "Data Mining Techniques for Autonomous Exploration of Large vols. Of Geo-referenced Crime Data", 6th International Conference on GeoCom.putation, University of Queensland, Brisbane, Australia, Sep. 24-26, 2001, 12 pages.
Estkowski, No Steiner Point Subdivision Simplification is NP-Complete, in Proceedings of the 10th Canadian Conference on Computational Geometry, pp. 11-20, 1998.
Eustice et al, "The Smart Party: A Personalized Location Aware Multimedia Experience", Consumer Communications and Networking Conf, Jan. 2008, 5 pgs.
Faloutsos et al, "Fast Subsequence Matching in Time-Series Databases," Proceedings of the 1994 ACM SIGMOD International Conference on Management of Data, vol. 23, No. 2, Jun. 1994, 11 pgs.
"Flow Control Platform (FCP) Solutions", retrieved on Jul. 5, 2007, at <<http://k2colocation.com/network-services/fcp.cfm>>, K2 Colocation, 2005, 2 pgs.
Frentzos et al, "Algorithms for Nearest Neighbor Search on Moving Object Trajectories", retrieved on Apr. 15, 2010 at <<http://infolab.cs.unipi.gr/pubs/journals/FGPT06-Geoinformatica.pdf>>, Kluwer Academic Publishers, Geoinformatica, vol. 11, No. 2, Jun. 2007, pp. 1-32.
Frentzos et al, "Index-based Most Similar Trajectory Search", retrieved on Apr. 15, 2010 at <<http://isl.cs.unipi.gr/pubs/TR/UNIPI-ISL-TR-2006-01.pdf>>, IEEE Conference on Data Engineering (Technical Report UNIPI-ISL-TR-2006-01), Jun. 2006, pp. 1-12.
Ge, et al., An Energy-Efficient Mobile Recommender System. In Proc. KDD 2010, ACM Press 2010, <<http://pegasus.rutgers.edu/~kelixiao/papers/An%20Energy-Efficient%20Mobile%20Recommender%20System.pdf>>.
Ge et al., "An Energy-Efficient Mobile Recommender System", KDD'10, Jul. 25-28, 2010, 9 pages.
Ge, et al., Top-Eye: Top-k Evolving Trajectory Outlier Detection, Proceedings of CIKM 2010, Toronto, Canada, 4 pages.
Giannotti, et al., "Efficient Mining of Temporally Annotated Sequences", retrieved on Aug. 4, 2009 at <<http://www.siam.org/meetings/sdm06/proceedings/032giannottif.pdf>>, Proceedings of the Sixth SIAM Intl Conference on Data Mining, Apr. 2006, pp. 346-357.
Giannotti, et al., "Trajectory Pattern Mining", retrieved on Aug. 4, 2009 at <<http://cs.gmu.edu/~jessica/temp/p330-giannotti.pdf>>, ACM, KDD'07, Aug. 2007, pp. 330-339.
"Global Server Load Balancing for Disaster Recovery, Business Continuity, Performance Optimization and Datacenter Management ", Zeus Technology Limited, retrieved at <<http://www.zeus.com/documents/en/ZXR/ ZXTM_Global_Load_Balancer.pdf>>, Zeus Technology Limited, 1995-2007, 4 pgs.
Goldberg, et al., "Computing the Shortest Path: A Search Meets Graph Theory", SODA'05 Proceedings of the Sixteenth Annual ACM-SIAM Symposium on Discrete Algorithms, Jan. 2005, pp. 156-165, 10 pgs.
Gonzalez, Han, Li, Myslinska, Sondag, "Adaptive Fastest Path Computation on a Road Network: A Traffic Mining Approach", retrieved on Dec. 24, 2009 at <<http://www.cs.uiuc.edu/~hanj/pdf/vldb07_hagonzal.pdf>>, Published by VLDB Endowment, Proceedings of Conference on Very Large Data Bases, Novel Data Mining Applications, Sep. 23, 2007, pp. 794-805.
Gonzalez, Hidalgo, Barabasi, "Understanding individual human mobility patterns Supplementary Material", retrieved on Dec. 29, 2009 at <<http://www.barabasilab.com/pubs/CCNR-ALB_Publications/200806-05_Nature-MobilityPatterns/200806-05_Nature-MobilityPatterns-SuppMat13.pdf>>, Nature, vol. 453, 2008, pp. 779-782.
GPS Sharing, retrieved Feb. 4, 2013 at http://web.archive.org/web/20071129224158/http://gpssharing.com, 2 pgs.
"GPS Track Route Exchange Forum", 2010 GPSXchange.com website, 3 pages, retrieved on Apr. 16, 2010 at <<http://www.gpsxchange.com/phpBB2/index.php>>.
"GPS-Waypoints", retrieved on Apr. 15, 2010 at <<http://www.gps-waypoints.net/>>, 2010, p. 1.
Graham, "GPS Gadgets Can Reveal More Than Your Location", Retrieved on Nov. 28, 2011 at <<http://www.google.com/#sclient=psy-ab&hl=en&source=hp&
q=Graham%2C+GPS+Gadgets+Can+Reveal+More+Than+
Your+Location&pbx=1&
oq=Graham%2C+GPS+Gadgets+Can+Reveal+More+Than+
Your+Location%22%2C+&aq=f&aqi=&aql=&gs_sm=d&gs_
upl=2870l6708l0l10140l212l0l0l0l0l266l43810.1.11210&bav=on.
2,or.r_gc.r_pw.,cf.osb&fp=533a712cc6ce8ba0&biw=1280&
bih=808>>, 2008, pp. 1-2.
Greenfeld, "Matching GPS Observations to Locations on a Digital Map", In the Proceedings of the 81st Annual Meeting of the Transportation Research Board, Washington DC, Jan. 2002, 13 pgs.
Guehnemann, et al., Monitoring traffic and emissions by floating car data. Institute of transport studies Australia; 2004, <<http://elib.dlr.de/6675/1/its_wp_04-07.pdf>>.
Gustavsen, "Condor—an application framework for mobility-based context-aware applications", retrieved on Aug. 4, 2009 at <<http://www.comp.lancs.ac.uk/~dixa/conf/ubicomp2002-models/pdf/Gustaysen-goteborg%20sept-02.pdf>>, UBICOMP 2002, 2002, pp. 1-6.
Gutman, "Reach-Based Routing: A New Approach to Shortest Path Algorithms Optimized for Road Networks", In the Proceedings of the Sixth Workshop on Algorithm Engineering and Experiments and the First Workshop on Analytic Algorithmics and Combinatorics, New Orleans, LA, USA, Jan. 10, 2004, 12 pgs.
Guttman, "R-Trees: A Dynamic Index Structure for Spatial Searching", retrieved on Apr. 15, 2010 at <<http://www.google.co.in/url?sa=t&source=web&ct=res&cd=1&ved=0CAcQFjAA
&url=http%3A%2F%2Fciteseerx.ist.psu.
edu%2Fviewdoc%2Fdownload%3Fdoi%3D10.1.1.66.
1675%26rep%3Drep1%26type%3Dpdf&rct=j&q=R-
trees%3A+a+dynamic+index+structure+for+spatial+searching&
ei=JfTGS6uRPJH0_AaCpICHDQ&
usg=AFQjCNFtQttNVHCKYJQZcH052-KmCxlZ0g>>, ACM, Proceedings of Conference on Management of Data, 1984, pp. 47-57.

(56) References Cited

OTHER PUBLICATIONS

Hadjieleftheriou, et al., "Complex Spatio-Temporal Pattern Queries", Proceedings of the 31st VLDB Conference, Sep. 2005, pp. 877-888.

Hadjieleftheriou, et al., "Efficient Indexing of Spatiotemporal Objects", Proceedings of the 8th International Conference on Extending Database Technology: Advances in Database Technology, Mar. 2002, 10 pages.

Han, et al., "Frequent pattern mining: current status and future directions", retrieved on Aug. 4, 2009 at <<http://www.springerlink.com/content/9p5633hm18x55867/fulltext.pdf>>, Springer Science+Business Media, LLC, 2007, pp. 55-86.

Han, et al., "Predicting User' Movement with a Combination of Self-Organizing Map and Markov Model", ICANN 2006, Part II, LNCS 4132, Sep. 2006, pp. 884-893.

Hariharan et al, "NetTrust—Recommendation System for Embedding Trust in a Virtual Realm", ACM Recommender Systems, Oct. 2007, 6 pgs.

Hariharan, et al., "Project Lachesis: Parsing and Modeling Location Histories", ACM, In the Proceedings of GIScience, 2004, pp. 106-124.

Hart, et al., "A Formal Basis for the Heuristic Determination of Minimum Cost Paths", in the Proceedings of IEEE Transactions of Systems Science and Cybernetics, vol. 4, No. 2, Feb. 12, 2007 (First Publication 1968), pp. 100-107.

Hirose, et al., Network Anomaly Detection based on Eigen Equation Compression, in Proceedings of the 15th SIGKDD Conference on Knowledge Discovery and Data Mining, pp. 1185-1194, 2009 ACM. <<http://www.ibis.t.u-tokyo.ac.jp/yamanishi/ID361_Network_Anomaly_Detection.pdf>>.

Hjaltason, Samet, "Distance Browsing in Spatial Databases", retrieved on Apr. 15, 2010 at <<http://citeseerx.ist.psu.edu/viewdoc/download?doi=10.1.1.25.4224&rep=rep1&type=pdf>>, ACM Transactions on Database Systems, vol. 24, No. 2, Jun. 1999, pp. 265-318.

Horozov et al., "Using Location for Personalized POI Recommendations in Mobile Environments", Proceedings of the 2006 International Symposium on Applications and the Internet (Saint 2006), Phoenix, Arizona, Jan. 23-27, 2006, pp. 124-129.

Huang, Shekhar, Xiong, "Discovering Co-location Patterns from Spatial Datasets: a General Approach", retrieved on Dec. 29, 2009 at <<http://www.spatial.cs.umn.edu/paper_ps/coloc-tkde.pdf>>, IEEE Transactions on Knowledge and Data Engineering, vol. 16, Issue 12, Dec. 2004, pp. 1472-1485.

Huang, et al., "Project Report (draft version) Spatial Outlier Detection", retrieved on Dec. 12, 2008 at <<http://www-users.cs.umn.edu/~joh/csci8715/P6.pdf>>, Computer Science Department, University of Minnesota, 2004, pp. 1-8.

International Preliminary Report on Patentability cited in PCT Application No. PCT/US2009/032777 dated Sep. 10, 2010, 6 pages.

International Search Report for PCT/US2009/063023 (WO 2010/062726), mailed Jun. 10, 2010, 4 pgs.

Ishi, et al., "Head Motion During Dialogue Speech and Nod Timiong Control in Humanoid Robots", 5th ACM/IEEE International Conference on Human-Robot Interaction (HRI'10), Mar. 2010, pp. 293-300.

International Search Report and Written Opinion Received for PCT Application No. PCT/US2009/0327777, mailed Aug. 26, 2009, 10 pages.

International Search Report dated Aug. 19, 2009 for PCT Application No. PCT/US2009,032778, filed Jan. 31, 2009, 11 pages.

Jan, Horowitz, Peng, "Using GPS Data to Understand Variations in Path Choice", retrieved on Apr. 15, 2010 at <<https://pantherfile.uwm.edu/horowitz/www/pathchoice.pdf>>, National Research Council, Transportation Research Record 1725, 2000, pp. 37-44.

Jarvelin et al, "Cumulated Gain Based Evaluation of IR Techniques", ACM Transactions on Information Systems, vol. 20, No. 4, Oct 2002, pp. 422-446.

Jing, et al., "Hierarchical Optimization of Optimal Path Finding for Transportation Applications", (University of Michigan Research Paper, 1996, pp. 269-276) In the Proceedings of the Fifth International Conference on Informaton and Knowledge Management, 1996, pp. 261-268.

Jones et al, "P3 Systems: Putting the Place Back into Social Networks", IEEE Internet Computing, Sep.-Oct. 2005, pp. 38-46.

Kanoulas, Du, Xia, Zhang, "Finding Fastest Paths on a Road Network with Speed Patterns", retrieved on Dec. 24, 2009 at <<http://www.inf.unibz.it/dis/teaching/SDB/paper/kanoulasDXZ_icde06_fastestpath.pdf>>, IEEE Computer Society, Proceedings of Conference on Data Engineering (ICDE), 2006, pp. 1-10.

Kavouras, et al., "A Method for the Formalization and Integration of Geographic Categorizations", Draft version from the International Journal of Geographic Information Science, vol. 16, No. 5, 2002, pp. 439-453.

Ke, et al., "Correlated Pattern Mining in Quantitative Databases", ACM Transactions on Database Systems, vol. V, No. N, Apr. 2008, 44 pages.

Ke, et al., "Efficient Correlations Search from Graph Databases", IEEE Transactions on Knowledge and Data Engineering, vol. 20, Issue 12, Dec. 2008, pp. 1601-1615.

Kharrat, Popa, Zeitouni, Faiz, "Clustering Algorithm for Network Constraint Trajectories", retrieved on Apr. 15, 2010 at <<http://www.prism.uvsq.fr/~karima/papers/SDH_08.pdf>>, Springer Berlin, Symposium on Spatial Data Handling (SDH), 2008, pp. 631-647.

Kindberg, et al., Urban computing. Pervasive computing. IEEE Computer Society. 6, 3, pp. 18-20. Aug. 2007, <<http://ieeexplore.ieee.org/stamp/stamp.jsp?tp=&arnumber=4287439&userType=inst>>.

Korn, Pagel, Faloutsos, "On the 'Dimensionality Curse' and the 'Self-Similarity Blessing'", retrieved on Apr. 15, 2010 at <<http://www.informedia.cs.cmu.edu/documents/korn_dimcurse_2001.pdf>>, IEEE Educational Activities Department, Transactions on Knowledge and Data Engineering, vol. 13, No. 1, Jan. 2001, pp. 96-111.

Kostakos, et al., Urban computing to bridge online and real-world social networks. Handbook of Research on Urban Informatics, 2008, <<http://hci.uma.pt/courses/ubicomp/papers/social/kostakos-08.pdf>>.

Kou, et al., "Spatial Weighted Outlier Detection", retrieved on Dec. 12, 2008 at <<http://www.siam.org/proceedings/datamining/2006/dm06_072kouy.pdf>>, SIAM Conference on Data Mining, 2006, pp. 614-618.

Krumm, et al., "Locadio: Inferring Motion and Location from Wi-Fi Signal Strengths", retrieved on Aug. 4, 2009 at <<http://research.microsoft.com/en-us/um/people/horvitz/locadio.pdf>>, Proceedings of Mobiquitous 2004, 2004, pp. 4-13.

Krumm, et al., "Predestination: Inferring Destinations from Partial Trajectories", retrieved on Aug. 4, 2009 at <<http://research.microsoft.com/en-us/um/people/horvitz/predestination.pdf>>, UBICOMP 2006, 2006, pp. 1-18.

Krumm, et al., "Predestination: Where Do You Want to Go Today?", retrieved on Aug. 4, 2009 at <<http://research.microsoft.com/en-us/um/people/horvitz/predestination-ieee.pdf>>, IEEE Computer Magazine, vol. 40, No. 4, Apr. 2007, pp. 105-107.

Lafferty, et al., "Conditional Random Fields: Probabilistic Models for Segmenting and Labeling Sequence Data", Proceedings of the 18th International Conference on Machine Learning, Jun. 2001, 8 pages.

Lakhina, et al., Diagnosing Network-Wide Traffic Anomalies, In Proceedings of the SIGCOMM 2004 Conference, 12 pages, 2004 ACM.

Lavondes, et al., "Geo::PostalAddress—Country-specific postal address parsing/formatting", retrieved on Dec. 16, 2008 at <<http://search.cpan.org/~pauamma/Geo-PostalAddress-0.04/PostalAddress.pm>>, CPAN, 2004, pp. 1-8.

Lee et al, "Efficient Mining of User Behaviors by Temporal Mobile Access Patterns", IJCSNS International Journal of Computer Science and Network Security, vol. 7, No. 2, Feb. 2007, pp. 285-291.

Lee, et al., "TraClass: Trajectory Classification Using Hierarchical Region-Based and Trajectory-Based Clustering", retrieved on Aug. 4, 2009 at <<http://www.cs.uiuc.edu/homes/hanj/pdf/vldb08_jglee.pdf>>, ACM, VLDB 2008, vol. 1, Issue 1, 2008, pp. 1081-1094.

(56) References Cited

OTHER PUBLICATIONS

Lee, et al., Trajectory Clustering: A Partition-and-group Framework, In Proceedings of the 26th ACM SIGMOD International Conference on Management of Data 2007, pp. 593-604, 2007.

Lee, et al., "Trajectory Clustering: A Partition-and-Group Framework", retrieved on Aug. 4, 2009 at <<http://www.cs.uiuc.edu/homes/hanj/pdf/sigmod07_jglee.pdf>>, ACM, SIGMOD 2007, 2007, pp. 1-12.

Lee, et al., Trajectory Outlier Detection: A Partition-and-Detect Framework, In Proceedings of the 26th ACM SIGMOD International Conference on Management of Data, SIGMOD2007, pp. 593-604, 2007.

Lemire, Maclachlan, "Slope One Predictors for Online Rating-Based Collaborative Filtering", retrieved on Dec. 29, 2009 at <<http://www.daniel-lemire.com/fr/documents/publications/lemiremaclachlan_sdm05.pdf>>, SIAM Proceedings of Data Mining (SDM), 2005, pp. 1-5.

Li, et al., "A Connectivity-Based Map Matching Algorithm", AARS, Asian Journal of Geoinformatics, 2005, vol. 5, No. 3, pp. 69-76.

Li, et al., Mining user similarity based on location history. In Proc. ACM GIS 2008, ACM Press: 1-10, <<http://mc.eistar.net/Paper/Mining%20user%20similarity%20based%20on%20location%20history.pdf>>.

Li, et al., Temporal Outlier Detection in Vehicle Traffic Data, Proceedings of the 2009 IEEE International Conference on Data Engineering, pp. 1319-1322, <<http://www.cs.uiuc.edu/~hanj/pdf/icde09_xli.pdf>>.

Li, et al., "Traffic Density-Based Discovery of Hot Routes in Road Networks", Springer-Verlag, Advances in Spatial and Temporal Databases, 2007, pp. 441-459.

Liao, et al., Anomaly Detection in GPS Data Based on Visual Analytics, Proceedings of the 2010 IEEE Symposium, Oct. 2010, pp. 51-58, <<http://web.siat.ac.cn/~baoquan/papers/GPSvas.pdf>>.

Liao, et al., "Building Personal Maps from GPS Data", retrieved on Aug. 4, 2009 at <<http://luci.ics.uci.edu/predeployment/websiteContent/weAreLuci/biographies/faculty/djp3/LocalCopy/JR-004.pdf>>, Proceedings of IJCAI MOO 2005, 2005, pp. 249-265.

Liao, et al., "Learning and Inferring Transportation Routines", Elsevier, Artificial Intelligence, vol. 171, Issues 5-6, Apr. 2007, pp. 311-331.

Liao, et al. "Learning and inferring transportation routines", Artificial Intelligence, vol. 171, Feb. 2007, pp. 311-331.

Liao et al., "Learning and Inferring Transportation Routines", American Association for Artificial Intelligence Press (AAAI) 19th National Conference on Artificial Intelligence, San Jose, California, Jul. 25-29, 2004, pp. 348-353, retrieved on Apr. 16, 2010 at <<http://www.cs.rochesteredu/~kautz/papers/gps-tracking.pdf>>.

Liao et al., "Location-based Activity Recognition", Proceedings of the 19th Annual Conference on Neural Information Processing Systems (NIPS-2005), Whistler, British Columbia, Canada, Dec. 5-10, 2005, 8 pages, retrieved on Apr. 16, 2010 at <<http://books.nips.cc/papers/files/nips18/NIPS2005_0773.pdf>>.

Linden et al, "Amazon.com Recommendations, Item to Item Collaborative Filtering", IEEE Internet Computing, Jan. and Feb. 2003, pp. 76-80.

Linden, "The End of Federated Search?", at <<http://glinden.blogspot.com/2007/03/end-of-federated-search.html>>, Mar. 24, 2007, p. 9.

Lippi, et al., Collective Traffic Forecasting, Proceedings of the European Conference on Machine Learning and Principles and Practice of Knowledge Discovery Database, ECML PKDD 2010, pp. 259-273, 2010.

Liu, et al., Uncovering cabdrivers' behavior patterns from their digital traces, Computers, Environment and Urban Systems, 2010.

Lozano, et al., Spatial-temporal Causal Modeling for Climate Change Attribution, Kdd 2009, Paris France, ACM 2009, 10 pages.

Mamoulis, Cao, Kollios, Hadjieleftheriou, Tao, Cheung, "Mining, Indexing, and Querying Historical Spatiotemporal Data", retrieved on Dec. 29, 2009 at <<http://i.cs.hku.hk/~nikos/sigkdd2004_1.pdf>>, ACM Proceedings of Conference on Knowledge Discovery and Data Mining (KDD), Aug. 22, 2004, pp. 236-245.

Manning et al., "An Introduction to Information Retrieval", DRAFT, Cambridge University Press, Apr. 1, 2009, 581 pages, retrieved on Apr. 16, 2010 at <<http://nlp.stanford.edu/IR-book/pdf/irbookonlinereading.pdf>>.

Markowetz, et al., "Design and Implementation of a Geographic Search Engine", Eighth International Workshop on the Web Databases (WebDB 2005), Baltimore, MD, Jun. 16-17, 2005, Baltimore, MD, 6 pages.

Masoud, et al., "Fast Algorithms for Outlier Detection", retrieved on Dec. 12, 2008 at <<http://www.scipub.org/fulltext/jcs/jcs42129-132.pdf>>, Journal of Computer Science, vol. 4, No. 2, 2008, pp. 129-132.

Matsuo et al, "Inferring Long Term User Properties Based on Users' Location History", Proc 20th Intl Joint Conf on Artificial Intelligence, Jan. 2007, pp. 2159-2165.

McDonald et al, "Expertise Recommender: A Flexible Recommendation System and Architecture", CSCW 2000, Dec. 2000, pp. 231-240.

McKeown, et al., "Integrating Multiple Data Representations for Spatial Databases", retrieved on Dec. 12, 2008 at <<http://mapcontext.com/autocarto/proceedings/auto-carto-8/pdf/integrating-multiple-data-representations-for-spatial-databases.pdf>>, Auto Carto 8 Conference Proceedings (ASPRS and ACSM), 1987, pp. 754-763.

Michael et al, "Location Based Intelligence—Modeling Behavior in Humans Using GPS", Proc Intl Symposium on Technology and Society, Jun. 2006, 8 pgs.

Miller, "Analysis of Fastest and Shortest Paths in an Urban City Using Live Vehicle Data from a Vehicle-to-Infrastructure Architecture", retrieved on Dec. 24, 2009 at <<http://www.sigmacoding.com/jeff/publications/fastest-path-ifac09.pdf>>, Federation on Automatic Control Symposium on Control in Transportation Systems (IFAC), Sep. 2009., pp. 1-5.

Min-qi, et al., "An Algorithm for Spatial Outlier Detection Based on Delaunay Triangulation", In the Proceedings of the 2008 International Conference on Computational Intelligence and Security, Dec. 2008, pp. 102-107.

Mitchell, et al., "Six in the City: Introducing Real Tournament—A Mobile IPv6 Based Context-Aware Multiplayer Game", NetGames'03, May 2003, pp. 91-100.

Miyaki, et al., "Tracking Persons Using Particle Filter Fusing Visual and Wi-Fi Localizations for Widely Distributed Camera", retrieved on Aug. 4, 2009 at <<http://ieeexplore.ieee.org/stamp/stamp.jsp?arnumber=04379287>>, IEEE Intl Conference on Image Processing, ICIP 2007, vol. 3, 2007, pp. 225-228.

Monreale, et al., "WhereNext: a Location Predictor on Trajectory Pattern Mining", retrieved Aug. 4, 2009 at <<http://delivery.acm.org/10.1145/1560000/1557091/p637-monreale.pdf?key1=1557091&key2=5182739421&coll=Guide&dl=Guide&CFID=47499709&CFTOKEN=90308932>>, ACM, KDD 2009, 2009, pp. 637-645.

Morimoto, "Mining Frequent Neighboring Class Sets in Spatial Databases", retrieved on Dec. 29, 2009 at <<http://delivery.acm.org/10.1145/510000/502564/p353-morimoto.pdf?key1=502564&key2=1634712621&coll=Guide&dl=Guide&CFID=70432903&CFTOKEN=93744375>>, ACM Proceedings of Conference on Knowledge Discovery and Data Mining (KDD), 2001, pp. 353-358.

Morse, Patel, "An Efficient and Accurate Method for Evaluating Time Series Similarity", retrieved on Apr. 15, 2010 at <<http://www.eecs.umich.edu/db/files/sigmod07timeseries.pdf>>, ACM, Proceedings of Conference on Management of Data, Jun. 11, 2007, pp. 569-580.

Nicholson, "Finding the Shortest Route Between Two Points in a Network", British Computer Society, The Computer Journal, 1966, vol. 9, No. 3, pp. 275-280.

"North York Moors and Yorkshire Wolds Mountain Bke (MTB) Routes", retrieved on Jan. 17, 2008 from <<http://www.mtb-routs.co.uk/northyorkmorrs/default.aspx>>, 4 pages.

Nzouonta, et al, VANET Routing on City Roads using Real-Time Vehicular Traffic Information, IEEE Transactions on Vehicular

(56) References Cited

OTHER PUBLICATIONS

Technology, vol. 58, No. 7, Sep. 2009, <<http://web.njit.edu/~gwang/publications/TVT09.pdf>>.
Office action for U.S. Appl. No. 12/037,347, mailed on Jan. 13, 2014, Zheng, et al., "System for Logging Life Experiences Using Geographic Cues", 8 pages.
Office action for U.S. Appl. No. 12/712,857, mailed on Feb. 21, 2014, Zheng, et al., "Map-Matching for Low Sampling-Rate GPS Trajectories", 15 pages.
Office action for U.S. Appl. No. 12/353,940, mailed on Mar. 4, 2014, Zheng, et al., "Detecting Spatial Outliers in a Location Entity Dataset", 10 pages.
Office Action for U.S. Appl. No. 12/041,599, mailed on Jul. 25, 2011, Arne Josefsberg, "Failover in an Internet Location Coordinate Enhanced Domain Name System".
Office Action for U.S. Appl. No. 12/712,857, mailed on Aug. 5, 2013, Zheng, et al., "Map-Matching for Low Sampling-Rate GPS Trajectories", 15 pages.
Office Action for U.S. Appl. No. 12/037,347, mailed on Aug. 17, 2011, Yu Zheng, "System for Logging Life Experiences Using Geographic Cues", 9 pgs.
Office Action for U.S. Appl. No. 12/794,538, mailed on Sep. 18, 2013, Zheng, et al., "Searching Similar Trajectories by Locations", 12 pages.
Office Action for U.S. Appl. No. 13/324,758, mailed on Jan. 18, 2013, Zheng et al., "Urban Computing of Route-Oriented Vehicles", 48 pages.
Office Action for U.S. Appl. No. 12/711,130, mailed on Oct. 4, 2012, Zheng et al., "Mining Correlation Between Locations Using Location History", 15 pages.
Office Action for U.S. Appl. No. 13/188,013, mailed on Nov. 15, 2011, Josefsberg et al., "Internet Location Coordinate Enhanced Domain Name System", 14 pages.
Office Action for U.S. Appl. No. 12/353,940, mailed on Nov. 2, 2012, Zheng et al., "Detecting Spatial Outliers in a Location Entity Dataset", 11 pages.
Office action for U.S. Appl. No. 12/041,608, mailed on Nov. 22, 2013, Josefsberg, et al., "Client-Side Management of Domain Name Information", 7 pages.
Office action for U.S. Appl. No. 12/794,538, mailed on Nov. 25, 2013, Zheng, et al., "Searching Similar Trajectories by Locations", 18 pages.
Office action for U.S. Appl. No. 12/794,538, mailed on Nov. 29, 2011, Zheng et al. "Searching Similar Trajectories by Locations", 10 pages.
Office Action for U.S. Appl. No. 12/567,667, mailed on Dec. 19, 2012, Zheng et al., "Recommending Points of Interests in a Region", 18 pages.
Office Action for U.S. Appl. No. 12/562,588, mailed on Dec. 8, 2011, Yu Zheng, "Mining Life Pattern Based on Location History", 31 pgs.
Office action for U.S. Appl. No. 12/567,667, mailed on Feb. 25, 2014, Zheng et al., "Recommending Points of Interests in a Region", 31 pages.
Office Action for U.S. Appl. No. 12/353,940, mailed on Feb. 29, 2013, Zheng et al., "Detecting Spatial Outliers in a Location Entity Dataset", 9 pages.
Office Action for U.S. Appl. No. 12/041,599, mailed on Feb. 9, 2012, Arne Josefsberg, "Failover in an Internet Location Coordinate Enhanced Domain Name System", 27 pgs.
Office Action for U.S. Appl. No. 12/353,940, mailed on Mar. 23, 2012, Yu Zheng, "Detecting Spatial Outliers in a Location Entity Dataset", 6 pgs.
Office Action for U.S. Appl. No. 12/773,771, mailed on Mar. 26, 2012, Yu Zheng, "Collaborative Location and Activity Recommendations", 9 pgs.
Office Action for U.S. Appl. No. 12/711,130, mailed on Mar. 27, 2012, Yu Zheng, "Mining Correlation Between Locations Using Location History", 14 pgs.
Office action for U.S. Appl. No. 12/794,538, mailed on 4/22/14, Zheng et al., "Searching Similar Trajectories by Locations", 38 pages.
Non-Final Office Action for U.S. Appl. No. 12/041,608, mailed on Jun. 25, 2014, Josefsberg, et al., "Client-Side Management of Domain Name Information", 4 pages.
Office Action for U.S. Appl. No. 12/712,857, mailed on Jun. 6, 2014, Yu Zheng, "Map-Matching for Low-Sampling-Rate GPS Trajectories", 14 pages.
Office action for U.S. Appl. No. 12/712,053, mailed on Jun. 6, 2014, Zheng et al., "Route Computation Based on Route-Oriented Vehicle Trajectories", 24 pages.
Office Action for U.S. Appl. No. 13/324,758, mailed on Jul. 11, 2013, Zheng et al., "Urban Computing of Route Oriented Vehicles", 47 pages.
Office Action for U.S. Appl. No. 12/353,940, mailed on Jul. 17, 2014, Yu Zheng, "Detecting Spatial Outliers in a Location Entity Dataset", 10 pages.
Office Action for U.S. Appl. No. 12/567,667, mailed on Jul. 18, 2012, Zheng et al., "Recommending Points of Interests in a Region", 20 pages.
Office Action for U.S. Appl. No. 12/712,053, mailed on Aug. 15, 2012, Zheng et al., "Route Computation Based on Route-Oriented Vehicle Trajectories", 17 pages.
Final Office Action for U.S. Appl. No. 12/567,667, mailed on Aug. 27, 2014, Yu Zheng, "Recommending Points of Interests in a Region", 7 pages.
Office Action for U.S. Appl. No. 12/041,599, mailed on Sep. 21, 2012, Josefsberg et al., "Failover in an Internet Location Coordinate Enhanced Domain Name System", 9 pages.
Park, et al., "CoDNS: Improving DNS Performance and Reliability via Cooperative Lookups," retrieved at <<http://www.cs.princeton.edu/nsg/papers/codns_osdi_04/paper.pdf>>, Princeton University, OSDI'04: Proceedings of the 6th conference on Symposium on Opearting Systems Design \& Implementation, Dec 2004, pp. 1-16.
Park et al., "Location-Based Recommendation System Using Bayesian User's Preference Model in Mobile Devices", J. Indulska et al. (Eds.): UIC 2007, LNCS 4611, pp. 1130-1139, retrieved on Apr. 30, 2010 at <<http://sclab.yonsel.ac.kr/publications/paper/IC/UIC07-MHPark.pdf>>.
Patterson, et al., "Inferring High-Level Behavior from Low-Level Sensors", Springer-Verlag Berlin Heidelberg, Lecture Notes in Computer Science, International Conference on Ubiquitous Computing, 2003, vol. 2864, pp. 73-89.
Patterson, et al., "Inferring High-Level Behavior from Low-Level Sensors", retrieved on Aug. 4, 2009 at <<http://www.cs.rochesteredu/u/kautz/papers/High-Level-140.pdf>>, UBICOMP 2003, 2003, pp. 1-18.
Pelekis, et al., Unsupervised Trajectory Sampling, Proceedings of the European Conference on Machine Learning and Principles and Practice of Knowledge Discovery in Databases ECML PKDD 2010, pp. 17-33, 2010.
Pfoser et al., "Novel Approaches in Query Processing for Moving Object Trajectories", Proceedings of the 26th International Conference on Very Large Data Bases (VLDB 2000), Cairo, Egypt, Sep. 10-14, 2000, pp. 395-406.
Pfoser, et al., "Capturing the Uncertainty of Moving-Object Representations", Springer-Verlag, In the Proceedings of the 6th International Symposium on Advances in Spatial Databases, Lecture Notes in Computer Science, 1999, vol. 1651, pp. 111-131.
Popivanov, et al., "Similarity Search Over Time-Series Data Using Wavelets", Proceedings of the 18th International Conference on Data Engineering (ICDE'02),IEEE Computer Society, San Jose, CA, Feb. 26-Mar. 1, 2002, 10 pages.
Quddus, et al."Current Map-Matching Algorithms for Transport Applications: State-of-the-Art and Future Research Directions", Elsevier Ltd., Transportation Research Part C: Emerging Technologies, 2007, vol. 15, Issue 5, pp. 312-328.
Rekimoto, et al., "LifeTag: WiFi-based Continuous Location Logging for Life Pattern Analysis", retrieved on Aug. 4, 2009 at <<http://209.85.229.132/search?q=cache:fCil8hzKWxQJ:www.sonycsl.co.jp/person/rekimoto/papers/loca07.

(56) References Cited

OTHER PUBLICATIONS pdf+mining+individual+life+pattern+based+on+location+history&cd=5&hl=en&ct=clnk&gl=uk>>, LoCA 2007, 2007, pp. 35-49.
Ringberg, et al., Sensitivity of PCA for Traffic Anomaly Detection, SIGMETRICS 2007, pp. 109-120.
Rosenfeld, Connectivity in digital pictures. Journal of the ACN (JACM), 17(1):160, 1970.
Rosenfeld, Connectivity in digital pictures, Journal of the ACM 17 (1): pp. 146-160, 1970.
Roussopoulos, Kelley, Vincent, "Nearest Neighbor Queries", retrieved on Apr. 15, 2010 at <<http://www.cs.umd.edu/~nick/papers/nncolor.pdf>>, ACM, Presentation: Conference on Management of Data, 1995, pp. 1-23.
Saltenis, "Outlier Detection Based on the Distribution of Distances between Data Points", retrieved on Dec. 12, 2008 at <<http://www.mii.lt/informatica/pdf/INFO558.pdf>>, Informatica, vol. 15, No. 3, 2004, pp. 399-410'.
Salton, et al., "A Vector Space Model for Automatic Indexing", Communications of the ACM, vol. 187, No. 11, Nov. 1975, pp. 613-620.
Salton, "Dynamic Document Processing", Communications of the ACM, vol. 15, Issue 7, Jul. 1972, pp. 658-668.
Sarwar et al, "Application of Dimensionality Reduction in Recommender System, A Case Study", ACM WebKDD Workshop, Aug. 2000, 12 pgs.
Schofield, "It's GeoLife, Jim, But Not as we Know it", Guardian News, Retrieved on Nov. 28, 2011 at <<http://www.guardian.co.uk/technology/2008/mar/13/microsoft.research/print>>, Mar. 12, 2008, 2 pgs.
Schonfelder, "Between Routines and Variety Seeking: The Characteristics of Locational Choice in Daily Travel", retrieved on Dec. 12, 2008 at <<http://www.ivt.ethz.ch/vpl/publications/reports/ab192.pdf>>, 10th International Conference on Travel Behaviour Research, Aug. 10-15, 2003, pp. 1-32.
Sellen, et al., "Do Life-Logging Technologies Support Memory for the Past? an Experimental Study Using SenseCam", available at least as early as Nov. 16, 2007, at <<http://research.microsoft.com/sds/papers/SensecamMemCHICamRdy.pdf>>, p. 10.
"Share My Routes", retrieved on Apr. 15, 2010 at <<http://www.sharemyroutes.com/>>, 2010, pp. 1-2.
Shekhar et al., "A Unified Approach to Detecting Spatial Outliers", GeoInformatica, 7:2, Jun. 2003, pp. 139-166.
Shekhar, et al., "Data Mining for Selective Visualization of Large Spatial Datasets", In the Proceedings of the 14th IEEE International Conference on Tools with Artificial Intelligence, Nov. 2002, pp. 41-48.
Shekhar, et al., Unified approach to detecting spatial outliers, University of Helsinki 2007, 27 pages, <<http://www.cs.helsinki.fi/u/leino/opetus/spatial-k07/maksimainen.pdf>>.
Sherkat, Rafiei, "On Efficiently Searching Trajectories and Archival Data for Historical Similarities", retrieved on Apr. 15, 2010 at <<http://webdocs.cs.ualberta.ca/~drafiei/papers/vldb08.pdf>>, VLDB Endowment, Proceedings of Conference on Very Large Data Bases (VLDB), vol. 1, No. 1, Aug. 24, 2008, pp. 896-908.
Shiraishi, "A User-centric Approach for Interactive Visualization and Mapping of Geo-sensor Data", Networked Sensing Systems, 2007, INSS, Fourth International Conference on IEEE, Jun. 1, 2007, pp. 134-137.
Shklovski, et al., Urban Computing-Navigating Space and Context. IEEE Computer Society. 39 ,9, pp. 36-37, 2006 <<http://www.itu.dk/people/irsh/pubs/UrbanComputingIntro.pdf>>.
Simon, Frohlich, "A Mobile Application Framework for the geospatial Web", retrieved on Apr. 16, 2010 at <<http://www2007.org/papers/paper287.pdf>>, ACM, Proceedings of World Wide Web Conference (WWW), May 8, 2007, pp. 381-390.
Singh et al., "Relational Learning via Collective Matrix Factorization", Proceedings of the 14th ACM SIGKDD International Conference on Knowledge Discovery and Data Mining, Las Vegas, Nevada, Aug. 24-27, 2008, pp. 650-658, retrieved on Apr. 30, 2010 at <<http://www.cs.cmu.edu/-ggordon/CMU-ML-08-109.pdf>>.

"SlamXR List Routes Page By Microsoft Research Community Technologies Group", retrieved on Jan. 18, 2008 from <<http://www.msslam.com/slamxr/ListRoutes.aspx>, 2 pages.
Sohn, et al., "Mobility Detection Using Everyday GSM Traces", retrieved on Aug. 4, 2009 at <<http://www.placelab.org/publications/pubs/mobility-ubicomp2006.pdf>>, UBICOMP 2006, 2006, pp. 212-224.
Spertus et al, "Evaluating Similarity Measures: A Large Scale Study in the Orkut Social Network", Proc 11th ACM SIGKDD Intl Conf on Knowledge Discovery in Data Mining, Aug. 2005, 7 pgs.
Spinellis, "Position-Annotated Photographs: a Geotemporal Web", IEEE Pervasive Computing IEEE Service Center, Los Alamintos, CA, vol. 2, No. 2, Apr. 1, 2003, pp. 72-79.
"SportsDo", retrieved on Jan. 17, 2008 from <<http://sportsdo.net/Activity/ActivityBlog.aspx>>, 3 pages.
Srebro et al., "Weighted Low-Rank Approximations", Proceedings of the 20th International Conference on Machine Learning (ICML-2003), Washington, DC, Aug. 21-24, 2003, 8 pages, retrieved on Apr. 30, 2010 at <<http://people.scail.mit.edu/tommi/papers/SreJaa-icml03.pdf>>.
Strachan, et al., "gpsTunes Controlling Navigation via Audio Feedback", Proceedings of MobileHCI, Sep. 2005, 4 pages.
Sui, "Decision Support Systems Based on Knowledge Management", Proceedings of the International Conference on Services Systems and Services Management (ICSSSM'05), Jun. 2005, vol. 2, pp. 1153-1156.
Sun, et al., On Local Spatial Outliers, Technical Report No. 549, Jun. 2004, <<http://sydney.edu.au/engineering/it/research/tr/tr549.pdf>>, 9 pages.
Sun, "Outlier Detection in High Dimensional, Spatial and Sequential Data Sets", School of Information Technologies, the University of Sydney, Septemeber 2006, 118 pages.
Tai et al., "Recommending Personalized Scenic Itinerary with Geo-Tagged Photos", ICME, Jun. 2008, pp. 1209-1212.
Takeuchi et al., "City Voyager: An Outdoor Recommendation System Based on User Location History", Proceedings of the 3rd International Conference on Ubiquitous Intelligence and Couputing (UIC 2006), Wuhan, China, Sep. 3-6, 2006, pp. 625-636.
Takeuchi et al., "An Outdoor Recommendation System Based on User Location History", Proceedings of the 1st International Workshop on Personalized Context Modeling and Management for UbiComp Applications (ubiPCMM26type%3Dpdf+An+outdoor+recommendation+system+based+on+user+location.
Taylor, et al., "Virtual Differential GPS & Road Reduction Filtering by Map Matching", In the Proceedings of ION'99, Twelfth International Technical Meeting of the Satellite Division of the Institute of Navigation, 1999, pp. 1675-1684.
Tezuka, et al., "Toward Tighter Integration of Web Search with a Geographic Information System", WWW2006, May 2006, 10 pages.
Theodoridis, et al., "Spatio-Temporal Indexing for Large Multimedia Applications", Proceedings of the IEEE International Conference on Multimedia Systems, Jun. 1996, 9 pages.
Theodoridis, et al., "Specifications for Efficient Indexing in Spatiotemporal Databases", Proceedings of the Sddbm'98, Jul. 1998, 10 pages.
Toyama, et al., "Geographic Location Tags on Digital Images", MM'03, Nov. 2003, 11 pages.
Tsoukatos, et al., "Efficient Mining of Spatiotemporal Patterns", Proceedings of the 7th International Symposium on Spatial and Temporal Databases LNCS 2121, Redondo Beach, CA, Jul. 12-15, 2001, pp. 425-442.
"Twittervision", retrieved on Jan. 18, 2008 from <<http://twittervision.com>>, 1 page.
Vlachos, Kollios, Gunopulos, "Discovering Similar Multidimensional Trajectories", retrieved on Apr. 15, 2010 at <<http://www.google.co.in/url?sa=t&source=web&ct=res&cd=1&ved=0CAcQFjAA&url=http%3A%2F%2Fciteseerx.ist.psu.edu%2Fyiewdoc%2Fdownload%3Fdoi%3D10.1.1.106.1984%26rep%3Drep1%26type%3Dpdf&rct=j&q=Discovering+similar+multidimensional+trajectories&ei=ivfGS6HCM4uj_ga3wOiBDQ&usg=AFQjCNG20j6K3s_

(56) References Cited

OTHER PUBLICATIONS

WuY-VhWeDjlPYpgxv1Q>>, IEEE Computer Society, Proceedings of Conference on Data Engineering (ICDE), 2002, pp. 673-684.

Wang et al., "An Optimized Location-based Mobile Restaurant Recommend and Navigation System", WSEAS Transactions on Information Science and Applications, vol. 6, Issue 5, May 2009, pp. 809-818, retrieved on Apr. 16, 2010 at <<http://www.wseas.us/e-library/transactions/information/2009/29-186.pdf>>.

Wang, et al., "Closet+: Searching for the Best Strategies for Mining Frequent Closed Itemsets", retrieved on Aug. 4, 2009 at <<http://www.cs.umd.edu/~samir/498/wang03closet.pdf>>, ACM, SIGKDD 2003, 2003, pp. 236-245.

Wang et al., "Spatiotemporal Data Modelling and Management: a Survey", Technology of Object-Oriented Languages and Systems, 2000, ASI, Proceedings of the 36th International Conference on Oct. 30-Nov. 4, 2000, IEEE, pp. 202-211.

Wang et al., "Unifying User-based adn Item-based Collaborative Filtering Approaches by Similarity Fusion", Proceedings of the 29th Annual International ACM SIGIR Conference on Research and Development in Information Retrieval, Seattle, Washington, Aug. 6-11, 2006, pp. 501-508, retrieved on Apr. 30, 2010 at <<http://ict.ewi.tudelft.nl/pub/jun/sigir06_similarityfuson.pdf>>.

Ward et al., "Unsupervised Activity Recognition Using Automatically Mined Common Sense", American Association for Artificial Intelligence (AAAI 2005), Proceedings of the 20th National Conference on Artificial Intelligence, Pittsburgh, Pennsylvania, Jul. 9-13, 2005, 7 pages, retrieved Apr. 30, 2010 at <<http://www.cs.dartmouth,edu/-tanzeem/pubs/AAA1051WyattD.pdf>>.

Wasinger, et al., "M3I in a Pedestrian Navigation & Exploration System", Proceedings of the Fifth International Symposium on Human Computer Interaction with Mobile Devices, Sep. 2003, 5 pages.

Wei, et al., "A Service-Portlet Based Visual Paradigm for Personalized Convergence of Information Resources", 2nd IEEE International Conference on Computer Science and Information Technology, Aug. 2009, pp. 119-124.

"Weka 3: Data Mining Software in Java", retreived on Jan. 18, 2008 from <<http://www.cs.waikato.ac.nz/ml/weka/index_home.html>>, 1 page.

"Welcome to WalkJogRun", retreived on Jan. 17, 2008 from <<http://www.walkjogrun.net>>, 1 page.

Weng et al., "Design and Implementation of Spatial-temporal Data Model in Vehicle Monitor-System", Proceeding of the 8th International Conference on Geocomputation, Aug. 3, 2005, pp. 1-8.

Wikipedia, "Operating System", retrived from <<http://en.wikipedia.org/wiki/Operating_system>> on Oct. 8, 2010, 1 pg.

"WikiWalki Community Trail Guide", retrieved on Jan. 17, 2008 from <<http://www.wikiwalki.com>>, 1 page.

Winogard, "Dynamic Cartograms for Navigating Geo-referenced Photographs", available at least as early as Nov 16, 2007, at <<http://cs.stanford.edu/research/project.php?id=289>>, p. 2.

Wu, et al., Spatio-Temporal Outlier Detection in Precipitation Data, Knowledge Discovery from Sensor Data, pp. 115-133, 2010, <<http://sydney.edu.au/engineering/it/~ewu1/publications/WuLiuChawlaSensorKDD2008.pdf>>.

Xiao, Xie, Luo, Ma, "Density Based Co-Location Pattern Discovery", retrieved on Dec. 29, 2009 at <<http://www.cse.ust.hk/~xiaoxy/pub/gis-08.pdf>>, ACM Proceedings of Conference on Advances in Geographic Information Systems (Sigspatial), OLAP and co-location mining, Article 29, Nov. 5, 2008, pp. 1-10.

Xie, Zheng, "GeoLife: Building social networks using human location history", retrieved on Apr. 15, 2010 at <<http://research.microsoft.com/en-us/projects/geolife/>>, Microsoft Corporation, 2010, pp. 1-8.

Xie, "Understanding User Behavior Geospatially", Microsoft Research, Nov. 2008, 2 pgs.

Xue, "Efficient Similarity Search in Sequence Databases", retrieved on Apr. 15, 2010 at <<http://www.cs.uwaterloo.ca/~david/cs848/presentation-similarity-fengxue.pdf>>, University of Waterloo, Ontario Canada, Course Paper: CS 860 Topics in Database Systems, Nov. 18, 2009, pp. 1-7.

Yan, et al., "Clospan: Mining Closed Sequential Patterns in Large Datasets", retrieved on Aug. 4, 2009 at <<http://citeseerx.ist.psu.edu/viewdoc/download;jsessionid=AFADA02A222CC497F3OCEC7317F6C7A5?doi=10.1.1.12.3538&rep=rep1&type=pdf>>, Proceedings of Siam Int. Conference on Data Mining, SDM 2003, 2003, pp. 166-177.

Yan, et al., Discovery of frequent substructures, Wiley-Interscience, 2007, 99-113.

Yan, et al., "Feature-based Similarity Search in Graph Structures", ACM Transactions on Database Systems, vol. V, No. N, Jun. 2006, 36 pages.

Yavas, et al., "A data mining approach for location prediction in mobile environments", retrieved on Aug. 4, 2009 at <<http://www.cs.bilkent.edu.tr/~oulusoy/dke05.pdf>>, Elsevier B.V., 2004, pp. 121-146.

Ye, et al., "Mining Individual Life Pattern Based on Location History," Tenth International Conference on Mobile Data Management: Systems, Services and Middleware, May 18-20, 2009, Taipei, 10 pages.

Yegulalp, "Change the Windows 2000 DNS cache," retrieved on Apr. 29, 2008 at <<http://searchwincomputing.techtarget.com/tip/0,289483,sid68_gci1039955,00.html>>, SearchWinComputing.com, Aug. 21, 2002, 3 pgs.

Yi, Jagadish, Faloutsos, "Efficient Retrieval of Similar Time Sequences under Time Warping", retrieved on Apr. 15, 2010, at <<http://www.google.co.in/url?sa=t&source=web&ct=res&cd=3&ved=0CBYQFjAC&url=http%3A%2F%2Fciteseerx.+warping&ei=4ffGS5ShA4_0_Aalk5z8DA&usg=AFQjCNEkCq5vQwgb6OQfZmT_RWcgMZ2YNA>>, IEEE Computer.

Yuxiang, et al., Detecting Spatio-temporal Outliers in Climate Dataset: A Method Study, IEEE 2005, pp. 760-763.

Zhang, et al., "A Taxonomy Framework for Unsupervised Outlier Detection Techniques for Multi-Type Data Sets," Technical Report TR-CTIT-07-79, Centre for Telematics and Information Technology University of Twente, Enschede, Nov. 2007, pp. 1-40.

Zhang, Mamoulis, Cheung, Shou, "Fast Mining of Spatial Collocations", retrieved on Dec. 29, 2009 at <<http://i.cs.hku.hk/~dcheung/publication/sigkdd2004_2.pdf>>, ACM Proceedings of Conference on Knowledge Discovery and Data Mining (SIGKDD), Aug. 22, 2004, pp. 384-393.

Zhang, et al., iBAT: Detecting Anomalous Taxi Trajectories from GPS Traces, Proceedings of UbiComp Sep. 2011, 10 pages.

Zhang, et al., "Mining Non-Redundant High Order Correlations in Binary Data", International Conference on Very Large Data Bases (VLDB), Aukland, NZ, Aug. 23-28, 2008, pp. 1178-1188.

Zhang, et al., Network Anomography, USENIX Association, Internet Measurement Conference 2005, pp. 317-330.

Zhang, et al., "Research on Information Fusion on Evaluation of Driver Fatigue", 2008 International Symposium on Computer Scientc and Computational Technology, Dec. 2008, pp. 151-155.

Zhao, et al., "Searching for Interacting Features", Proceedings of the 20th International Joint Conference on Artificial Intelligence, Hyderabad, India, Jan. 6-12, 2007, pp. 1156-1161.

Zheng et al., "Collaborative Filtering Meets Mobile Recommendation: A User-centered Approach", to be presented at the Association for the Advancement of Artificial Intelligence (AAAI) 24th Conference on Artificial Intelligence, Atlanta, Georgia, Jul. 11-15, 2010, 6 pages., retrieved on Apr. 16, 2010 at <<http://research.microsoft.com/pubs/122244/AAAI10-Collaborative%20Filtering%20Meets%20Mobile%20Recommendation%20A%20User-centered%20Approach.pdf>>.

Zhang, et al., GeoLife: A Collaborative Social Networking Service among User, Location and Trajectory. IEEE Date Engineer Bulletin, 33(2). IEEE press 2010, 32-40, >>http://sites.computer.org/debull/A10june/geolife.pdf>>.

Zheng et al., "GeoLife: Managing and Understanding Your Past Life over Maps", IEEE Computer Society, In the Proceedings of the Ninth International Conference on Mobile Data Management, 2008, pp. 211-212, 2 pgs.

(56) References Cited

OTHER PUBLICATIONS

Zheng, Wang, Zhang, Xie, Ma, "GeoLife: Managing and Understanding Your Past Life over Maps", retrieved on Dec. 29, 2009 at <<http://research.microsoft.com/en-us/people/yuzheng/zheng-geolife-managing_and_understanding_your_past_life_over_map.pdf>>, IEEE Computer Society, Proceedings of Conference on Mobile Data Manage, 2008, pp. 211-212.

Zheng et al., "GeoLife2.0: A Location-Based Social Networking Service", Proceedings of the 10th International Conference on Mobile Data Management Systems, Services and Middleware, Taipei, Taiwan, May 18-20, 2009, pp. 357-358, retrieved on Apr. 16, 2010 at <<http://ieeexplore.ieee.org/stamp/stamp.jsp?tp=&arnumber=5088957>>.

Zheng et al., "Joint Learning User's Activities and Profiles from GPS Data", ACM Geographic Information Systems Workshop on Location Based Social Networks (ACM LBSN 2009), Seattle, Washington, Nov. 3, 2009, pp. 17-20, retrieved on Apr. 16, 2010 at <<http://delivery.acm.org/10.1145/1630000/1629894/p17-zheng.pdf?key1=1629894&key2=6324041721&coll=Guide&dl=Guide&CFID=86381688&CFTOKEN=49903381>>.

Zheng et al., "Learning Transportation Mode from Raw GPS Data for Geographic Applications on the Web", ACM Conference on World Wide Web (ACM WWW 2008)), Apr. 21, 2008, pp. 247-256, retrieved on Apr. 16, 2010 at <<http://research.microsoft.com/pubs/78567/fp485-Zheng.pdf>>.

Zheng et al., "Microsoft GeoLife Project, GeoLife: Building social networks using human location history", Microsoft Research, 2009, 4 pages, retrieved on Apr. 16, 2010 at <<http://research.microsoft.com/en-us/projects/geolife/default.aspx>>.

Zheng et al., "Mining Interesting Locations and Travel Sequences from GPS Trajectories", Proceedings of the 18th International Conference on World Wide Web (WWW 2009), Madrid, Spain, Apr. 20-24, 2009, pp. 791-800, retrieved on Apr. 16, 2010 at <<http://research.microsoft.com/pubs/79440/fp120-zheng.pdf>>.

Zheng et al., "Recommending friends and locations based on individual location history", In ACM Transaction on the Web, 2011, 44 pages, <<http://research.microsoft.com/pubs/122435/RecomFriend-zheng-Published.pdf>>.

Zheng et al., "Recommending Friend and Locations Based on Individual Location History", ACM Trans. Asian Language Information Processing, vol. 6, No. 3, Article 9, Ch. 45, Nov. 2007, 47 pages, retrieved on Apr. 16, 2010 at <<http://research.microsoft.com/pubs/122435/Recommending%20friends%20and%20locations%20based%20on%20individual%20location%20history.pdf>>.

Zheng, et al., "Searching Your Life on Web Maps", Microsoft Research, Available at <<http://research.microsoft.com/en-us/people/yuzheng/searching_your_life_over_web_maps.pdf>>, 2008, 4 pgs.

Zheng, et al., T-Drive: Driving Directions based on Taxi Trajectories, In Proc. ACM Sigspatial GIS 2010. ACM Press, 2010, 10 pages, <<http://www.cse.unt.edu/~huangyan/6350/paperList/T-Drive.pdf>>.

Zheng, Li, Chen, Xie, Ma, "Understanding Mobility Based on GPS Data", retrieved on Dec. 29, 2009 at <<http://delivery.acm.org/10.1145/1410000/1409677/p312-zheng.pdf?key1=1409677&key2=0364712621&coll=Guide&dl=Guide&CFID=70433597&CFTOKEN=93582958>>, ACM Proceedings of Conference on Ubiquitous Computing (UbiComp), vol. 344, Sep. 21, 2008, pp. 312-321.

Ziebart, et al., Navigate like a cabbie: Probabilistic reasoning from observed context-aware behavior. In Proc. Ubicomp 2008, pp. 322-331, <<http://citeseerx.ist.psu.edu/viewdoc/download?doi=10.1.1.141.7187&rep=rep1&type=pdf>>.

Takeuchi et al., "An Outdoor Recommendation System Based on User Location History", Proceedings of the 1st International Workshop on Personalized Context Modeling and Management for UbiComp Applications (ubiPCMM 2005), Tokyo, Japan, Sep. 11, 2005, pp. 91-100.

Yi, et al., "Efficient Retrieval of Similar Time Sequences under Time Warping", 1997, retrieved on Apr. 15, 2010, available at <<https://ai2-s2-pdfs.s3.amazonaws.com/4bbb/ce9b6b9e90d7908070109fe9260388e73009.pdf>>, 15 pages.

\* cited by examiner

DETERMINE SPATIOTEMPORAL CAUSAL INTERACTIONS IN DATA

RELATED APPLICATIONS

This application claims priority to and is a continuation of U.S. patent application Ser. No. 13/333,535, filed on Dec. 20, 2011, the entire contents of which are incorporated herein by reference.

BACKGROUND

Location-acquisition technologies collect huge volumes of spatiotemporal data in servers, databases, and cloud computing. The location-acquisition technologies use global positioning system (GPS), global system for mobile communications (GSM), Wi-Fi, etc. to enable collecting spatiotemporal data (space and time qualities) of location histories of where people visited and times of visits. The increasing availability of the spatiotemporal data has provided information in multiple ways. For instance, a large number of service vehicles transport passengers to and from various locations. Some service vehicles may be equipped with sensors to record their spatiotemporal data to a centralized server at regular intervals. The sensors may collect the spatiotemporal data in log books, which identify the locations where the service vehicles travelled with the passengers and times of travel.

However, a challenge includes trying to understand unusual spatiotemporal data of the service vehicles. Additional challenges include sparseness of the data for some roads travelled on and distribution skewness of the data for traffic travelled on different roads. Thus, there are opportunities using innovative technologies to analyze the data for valuable information.

SUMMARY

This disclosure describes detecting outliers from spatiotemporal data and evaluating spatiotemporal causal interactions in the outliers being detected. In one aspect, a process collects sequences of global positioning system (GPS) points in logs from service vehicles and identifies geographical locations to represent an area where the service vehicles travelled based on the logs. The process detects the outliers in the GPS points in the geographical locations by: dividing the area into regions based at least in part on major roads, generating links to connect two or more regions based on a number of transitions pertaining to the links for travel between the regions, calculating a score of minimum distort of features for each link in a time frame, and identifying extreme values among the score of minimum distort as temporal outliers.

In another aspect, computer-readable storage media encoded with instructions perform acts to receive sequences of global positioning system (GPS) points from logs of service vehicles and to create a model that simulates a relationship of traffic of the service vehicles travelling through regions in an area. The instructions further include generating a matrix of the regions from the model to: detect the outliers from a graph of the regions, construct outlier trees based on temporal and spatial properties of the detected outliers, and determine spatiotemporal causal relationships from the constructed outlier trees to correspond to abnormal traffic patterns.

In yet another aspect, an outlier application receives user input for an area to detect outliers in spatiotemporal data. The outlier application receives sequences of global positioning system (GPS) points from logs of service vehicles and creates a model of the traffic patterns in an area based on the GPS points. The model partitions regions in the area and constructs transitions of the GPS points from one region to another region. The model also generates links to connect two or more regions based on a number of transitions pertaining to the links for travel and calculates a score of minimum distort of features for each link in a time frame to detect spatiotemporal outliers that correspond to abnormal traffic patterns. Based on this evaluation, recommendations may be provided for diverting traffic to other streets, converting streets to one way streets, adding more subway lines, and the like.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The Detailed Description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Overview

Figure 1:
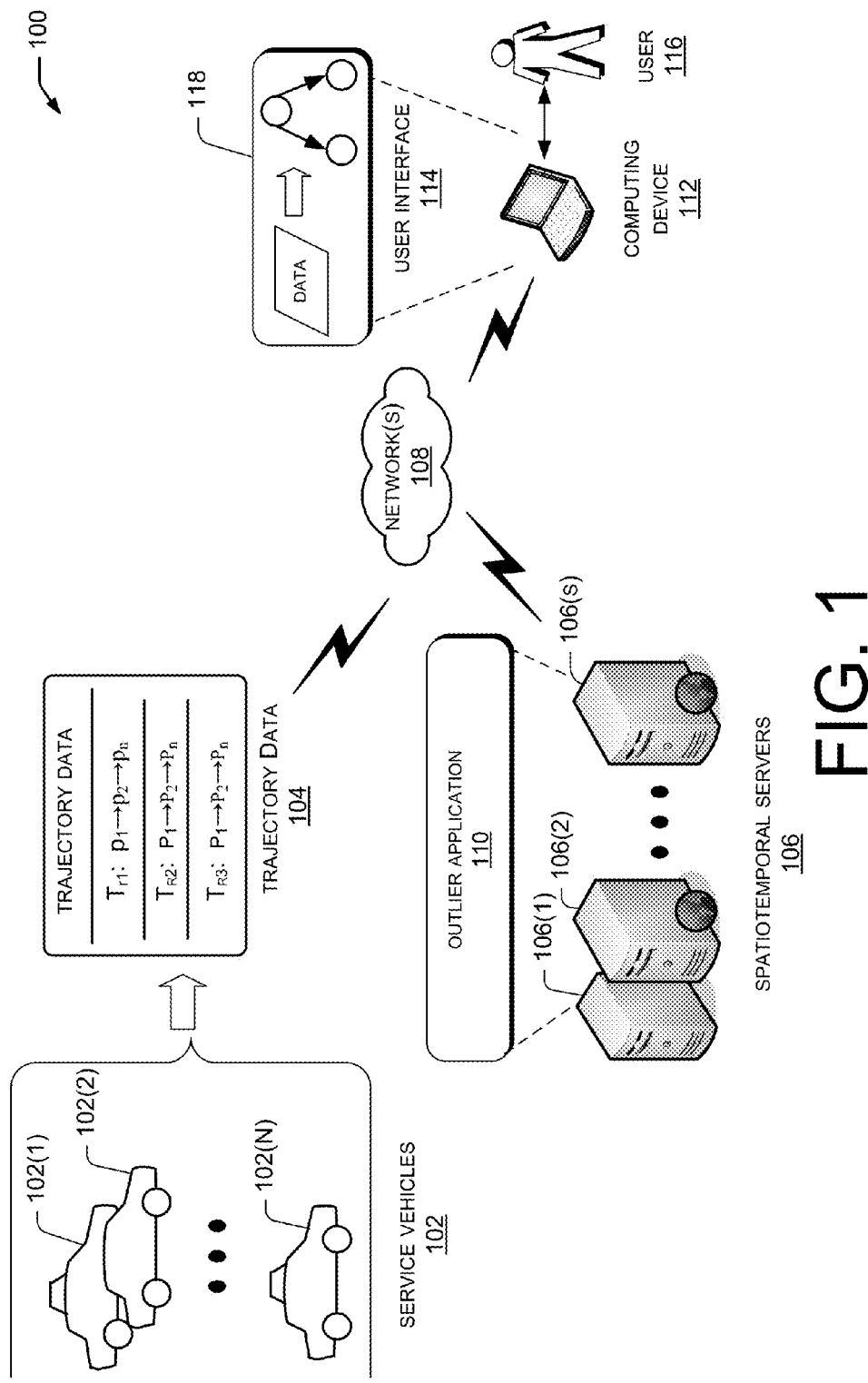
FIG. 1 illustrates an architecture to support an example environment to evaluate spatiotemporal causal interactions in data.

This disclosure describes a process for detecting outliers by identifying observations that appear to deviate from other points of the spatiotemporal data (i.e., both space and time information) and evaluating causal interactions among the detected spatiotemporal outliers. Next, the process provides recommendations based on an analysis of the outliers detected and the causal interactions among the detected spatiotemporal outliers.

An example of spatiotemporal data includes tracking of moving objects that may occupy a single position at a given time. Here, the process for the tracking may involve recording movements of service vehicles travelling in a geographical area at a given time. For instance, the service vehicles may travel through a specific region in the geographical area during rush hour between 4 p.m. and 6 p.m. Typically, a majority of the service vehicles tend to be equipped with sensors, such as global positioning system (GPS) sensors, which enable recording their movements and their locations to centralized servers at regular intervals.

Outliers may occur by chance in any distribution of data. For example, the process may detect the outliers in a collection of sequences of GPS points collected in logs from the service vehicles. The process builds a graph of regions from the logs to represent the geographical areas travelled by the service vehicles. The process detects unusual traffic patterns, such as the outliers, in the GPS points in the graph of regions based on observations farthest from data cluster in a three-dimensional unit cube. The unusual traffic patterns may reflect abnormal traffic streams on roads in the graph of regions, which may be caused by events such as celebrations in the streets, parades, large-scale business promotions, protests, traffic control, traffic jams, traffic accidents, rush hour congestion, road construction, weather conditions, and the like.

This disclosure also describes evaluating the causal interactions among the detected outliers of the spatiotemporal data. For instance, the process uses a variety of techniques, such as algorithms, to construct outlier causality trees based on temporal and spatial properties of the detected outliers (i.e., unusual traffic patterns). Based on analysis of the spatiotemporal causal relationships from the causality trees, the process provides recommendations to deal with the unusual traffic patterns in the graph of regions.

Initially, the process collects the spatiotemporal data from the service vehicles equipped with the sensors that constantly probe the geographical areas' traffic patterns, such as traffic flows on the roads and city-wide travel patterns of passengers in the service vehicles. The process analyzes trajectories, which are a collection of sequences of time-ordered GPS points moving in geographical locations. The trajectories represent trips with passengers to and from destinations for the service vehicles and imply human knowledge from drivers of the service vehicles. For example, human knowledge may include driving conditions during rush hour, road constructions, congestion of traffic, weather conditions, and the like.

The process creates a model to simulate the traffic patterns and to connect the traffic flows between the regions in the geographical area based on the trajectories from the service vehicles. Then the process detects the outliers from the model to analyze the unusual traffic patterns and possible reasons for the unusual traffic patterns. As mentioned, the process uses a variety of techniques, such as algorithms to build regions, to identify links to connect the regions, and to construct outlier trees. Based on the outliers detected, the process evaluates the causal interactions in the outliers affecting regions in the geographical area. For instance, the process may provide recommendations, such as adding public transportation, constructing additional roads, or converting roads to one way streets.

While aspects of described techniques can be implemented in any number of different computing systems, environments, and/or configurations, implementations are described in the context of the following example computing environment.

Illustrative Environment

FIG. 1 illustrates an example architectural environment 100, in which a process of detecting outliers in the spatiotemporal data may occur. The environment 100 includes the process of collecting logs from service vehicles 102(1)-(N). The service vehicles 102 may include but are not limited to, taxicabs, limousines, and shuttles that transport passengers to and from desired destinations. These types of service vehicles 102 tend to focus on picking up and dropping off passengers in a geographical area. The service vehicles 102 are configured to have sensors to track their movements and geographical locations. For instance, the sensors may include global positioning system (GPS) sensors which record logs of trajectory data 104. The trajectory data 104 includes time-ordered GPS points recorded at regular intervals sent to centralized servers. To better identify effective driving directions in the geographical area, the process parses trajectories from the logs. For instance, a trajectory in the trajectory data 104 may be represented by $Tr_1$ with GPS points represented by $p_1 \rightarrow p_2 \rightarrow p_n$. Drivers of the service vehicles 102 are very familiar with routes and time-variant traffic flows on roads. The drivers know the fastest routes, which are short and quick, but not necessarily the shortest in distance. Thus, the trajectory data 104 represents the routes travelled most often by the drivers in service vehicles 102 in the geographical area.

The trajectory data 104 from the centralized servers may be sent to spatiotemporal server(s) 106(1), 106(2), . . . , 106(S), via a network(s) 108. The spatiotemporal servers 106(1)-(S) may be configured as plural independent servers, or as a collection of servers that are configured to perform larger scale functions accessible by the network(s) 108. The network(s) 108 represents any type of communications network(s), including wire-based networks (e.g., cable), wireless networks (e.g., cellular, satellite), cellular telecommunications network(s), Wi-Fi networks, and IP-based telecommunications network(s).

The spatiotemporal server(s) 106 may be administered or hosted by a network service provider that provides an outlier application 110 to and from the computing device 112. The outlier application 110 processes the trajectory data 104 collected from the logs of the service vehicles 102. Based on the trajectory data 104 being processed, the outlier application 110 identifies geographical locations where the service vehicles 102 have travelled to generate a map of the geographical area. A discussion of building a graph of the regions occurs with reference to FIG. 3.

In the illustrated example, the computing device 112 may include a user interface (UI) 114 that is presented on a display of the computing device 112. The user interface 114 facilitates access to the outlier application 110 that detects outliers in the spatiotemporal data, and identifies spatiotemporal causal interactions in the detected outliers. For instance, the outlier application 110 evaluates the unusual patterns in a geographical area, constructs outlier trees based on the outliers detected in the geographical area, and determines the spatiotemporal causal interactions in the spatiotemporal data based at least in part on the detected outliers, such as unusual patterns in the traffic. A user 116 may employ the UI 114 to submit a request for a specific area from the outlier application 110.

In one implementation, the UI 114 is a browser-based UI that presents a page received from the outlier application 110. The UI 114 shows a representation 118 of outlier data regarding the geographical area and an outlier tree generated from the data.

The trajectory data 104 may be stored in a database, which may be a separate server or may be a representative set of servers 106 that is accessible via the network(s) 108. The database may store information, such as logs for the service vehicle(s) 102, a sequence of global positioning system (GPS) points, trajectory data 104, models, outlier trees, algorithms, other data, spatiotemporal data, and the like.

Figure 2:
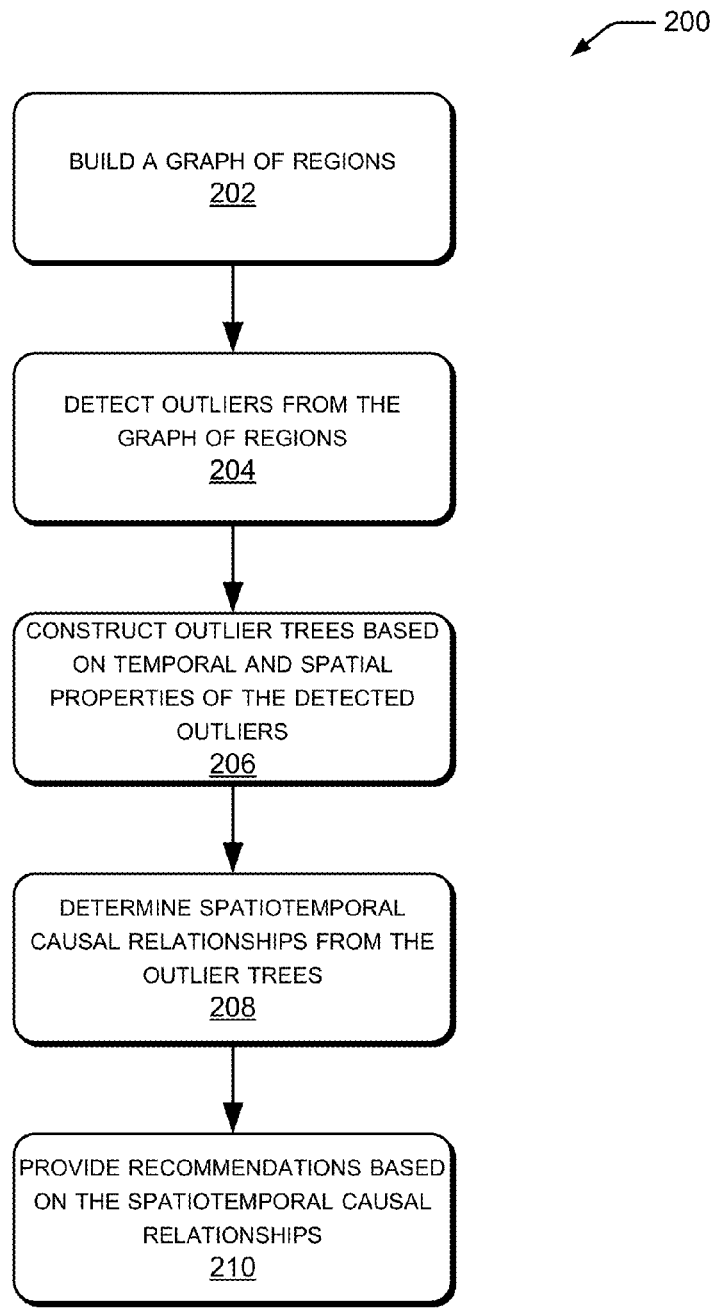
FIG. 2 is a flowchart showing example phases to: build a graph of regions, detect outliers from the graph of regions, determine spatiotemporal causal relationships among the outliers, and evaluate how the outliers affect the regions, to be used in the architecture of FIG. 1.

FIG. 2 is a flowchart of an example process 200 showing high-level functions performed by the outlier application 110. The processes are illustrated as a collection of blocks in logical flowcharts, which represent a sequence of operations that can be implemented in hardware, software, or a combination. For discussion purposes, the processes are described with reference to the computing environment 100 shown in FIG. 1. However, the processes may be performed using different environments and devices. Moreover, the environments and devices described herein may be used to perform different processes.

For ease of understanding, the methods are delineated as separate steps represented as independent blocks in the figures. However, these separately delineated steps should not be construed as necessarily order dependent in their performance. The order in which the process is described is not intended to be construed as a limitation, and any number of the described process blocks maybe be combined in any order to implement the method, or an alternate method. Moreover, it is also possible for one or more of the provided steps to be omitted.

The outlier application 110 identifies spatiotemporal causal interactions in the data of a geographical area based on detected outliers of unusual traffic patterns from the logs collected from the service vehicles 102. The process 200 may be divided into five phases, an initial phase 202 to build a graph of regions, a second phase 204 to detect outliers from the graph of regions, a third phase 206 to construct outlier trees based on temporal and spatial properties of the detected outliers, a fourth phase 208 to determine spatiotemporal causal relationships among the detected outliers based on the trees, and a fifth phase 210 to provide recommendations based on the spatiotemporal causal relationships. All of the phases may be used in the environment of FIG. 1, may be performed separately or in combination, and without any particular order.

The initial phase 202 is to build a graph of regions. For instance, the outlier application 110 collects the trajectory data 104 from the service vehicles 102. The outlier application 110 then identifies a geographical area travelled by the service vehicles 102 when picking up or dropping off passengers and divides the geographical area into regions based at least in part on major roads. The outlier application 110 builds the graph of regions with a node representing a region and formulating transitions of travelling from a first region to a second region. A link connects the two regions in a transition.

The second phase 204 is to detect outliers from the graph of regions. The outlier application 110 calculates a score of distort for each link in the graph of regions in time frames using an algorithm. A time frame is a set of consecutive time intervals. The score of distort represents non-spatial and non-temporal attributes of each link in each time frame. Meanwhile, the outlier application 110 identifies extreme values among the score of distort of all links in the graph of regions as temporal outliers.

The third phase 206 is to construct outlier trees based on temporal and spatial properties of the detected outliers. The outlier application 110 uses an algorithm to construct a collection of trees (i.e., a forest) and to retrieve possible descendants of a node. The outlier application 110 constructs the outlier trees by using a number of top outliers (i.e., number=3) detected in a same number (i.e., number=3) of consecutive time frames. Thus, the outlier application 110 identifies outlying links as children along with their parents.

The fourth phase 208 is to determine spatiotemporal causal relationships from the outlier trees. The outlier application 110 uses an algorithm to discover frequent subtrees from the constructed outlier trees. The frequent subtrees represent regions with design issues such as abnormal traffic patterns in the graph of regions.

The fifth phase 210 is to provide recommendations based on the spatiotemporal causal relationships. Based on an evaluation, the outlier application 110 may provide recommendations for public transportation systems, divert traffic to less travelled roads, construct additional streets, convert streets to one-way, for the regions. Details are discussed for building the graph of regions with reference to FIGS. 3-6, for detecting outliers from the graph of regions with reference to FIGS. 7-9, for constructing outlier trees from the detected outliers with reference to FIG. 10, and for performing processes discussed with reference to FIG. 11.

Build a Graph of Regions from Trajectory Data of Service Vehicles

Figure 3:
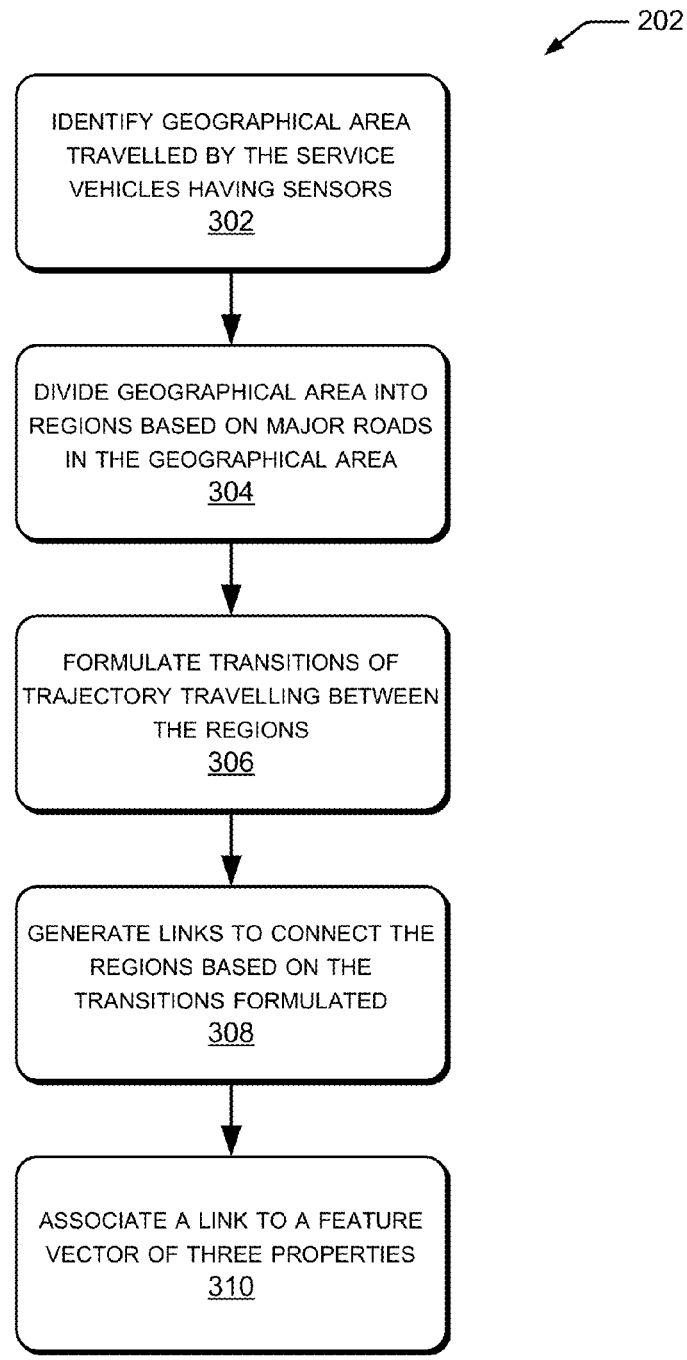
FIG. 3 is a flowchart showing an example process of building the graph of regions based at least in part on trajectory data from the logs of the service vehicles.

FIG. 3 is a flowchart illustrating an example process for phase 202 (discussed at a high level above) of building the graph of regions. The outlier application 110 may use the collected trajectory data 104 from the centralized servers or receive the logs of the trajectory data 104 from the service vehicle companies. Drivers for the service vehicles 102 may be very familiar with the roads and time-variant traffic flows on the roads. Along with their knowledge, the drivers consider other factors, such as traffic flows and signals, accidents, road constructions, direction turns, and the like. By directly following their routes that are well supported by the trajectory data 104, the knowledge of the drivers may be effectively used.

The outlier application 110 identifies the geographical area travelled by the service vehicles 102 having sensors 302. The geographical area from the trajectory data 104 represents roads and streets where the service vehicles 102 travelled transporting passenger(s). For example, GPS sensors record timestamps, coordinates of locations, and status of occupancy of each service vehicle 102 for a GPS point. The GPS point may contain a timestamp of a date with a time in a.m. or p.m. (d), a longitude coordinate (long), a latitude coordinate (lat), and the status of occupancy (o) which may be collected with a low sampling rate every two-five minutes per point at regular intervals, or may be set at shorter or longer intervals. Thus, the GPS point may be represented by $p_1$=(d, t, long, lat, o). The status of occupancy may be determined by a weight sensor for each of the service vehicles 102 to detect passengers other than the driver, a weight sensor on seats to determine if passengers occupied the seats of the service vehicles 102, an identifier of occupancy associated with fares indicating passengers are present in the service vehicles 102, and the like.

At 304, the outlier application 110 divides the geographical area into regions based on major roads in the geographical area. For instance, the outlier application 110 divides the geographical area into disjointed regions based on the major roads and smaller streets. A map of the geographical area may include but is not limited to, suburban, communities, towns, cities, and the like. An example of a map is shown with reference to FIG. 4.

At 306, the outlier application 110 formulates transitions of the trajectory travelling between the regions. The outlier application 110 associates each trajectory from the trajectory data 104 to a corresponding region in the geographical area. A transition represented by s is generated between two regions if a GPS point represented as $p_i$ is a first point in a first region 1 $r_1$ and a second point represented as $p_j$ is in a second region 2 $r_2$ (i<j). The transition s includes a departure time ($p_i$, $t_i$) from the first region, and an arrival time ($p_j$, $t_j$) in the second region. The outlier application 110 transfers each trajectory into a sequence of transitions between pairs of regions. For instance, a trajectory may represent travel of the service vehicle 102 through three regions represented as a, b, and c. As a result, two transitions occur which may be represented as a→b and b→c. The transitions are shown with reference to FIG. 5.

At 308, the outlier application 110 generates links to connect the regions based on the transitions formulated. A link includes a pair of regions represented as ($Rgn_o$, $Rgn_d$) to indicate a virtual spatial connection between an origin of a region $Rgn_o$ and a destination of a region $Rgn_d$. The link exists as long as there is at least one service vehicle 102 moving from the origin of the region $Rgn_o$ with a departure time to the destination of the region $Rgn_d$ with an arrival time. In other words, the outlier application 110 connects two regions with a link when there is a transition generated between two regions.

At 310, the outlier application 110 associates a link to a feature vector of properties. The outlier application 110 may separate the GPS points according to their timestamps. For instance, the outlier application 110 separates the GPS points into two groups, (1) weekdays and (2) weekends and/or holidays. Then the GPS points are further divided according to 30 minute increments into time bins. It is commonly understood that the time of day for travelling on the roads may affect the speed of the service vehicles 102. Traffic patterns are considerably different during rush hour on weekdays as compared to weekends.

The outlier application 110 uses one unit of time bin to represent a 30 minute period (i.e., 48 time bins represent a day). For instance, a time bin j, a link i may be associated with a feature vector represented as $\vec{f}_{i,j}$ having three properties. The three properties include (a) a total number of objects on this link (i.e., objects moving from the origin of the region to the destination of the region in a time bin), represented as #Obj, (b) a proportion of the objects among all of the objects moving out of the origin region during this time bin represented as $Pct_o$, and (c) the proportion of the objects among all of the objects moving into the destination region in this time bin, represented as $Pct_d$.

Figure 6:
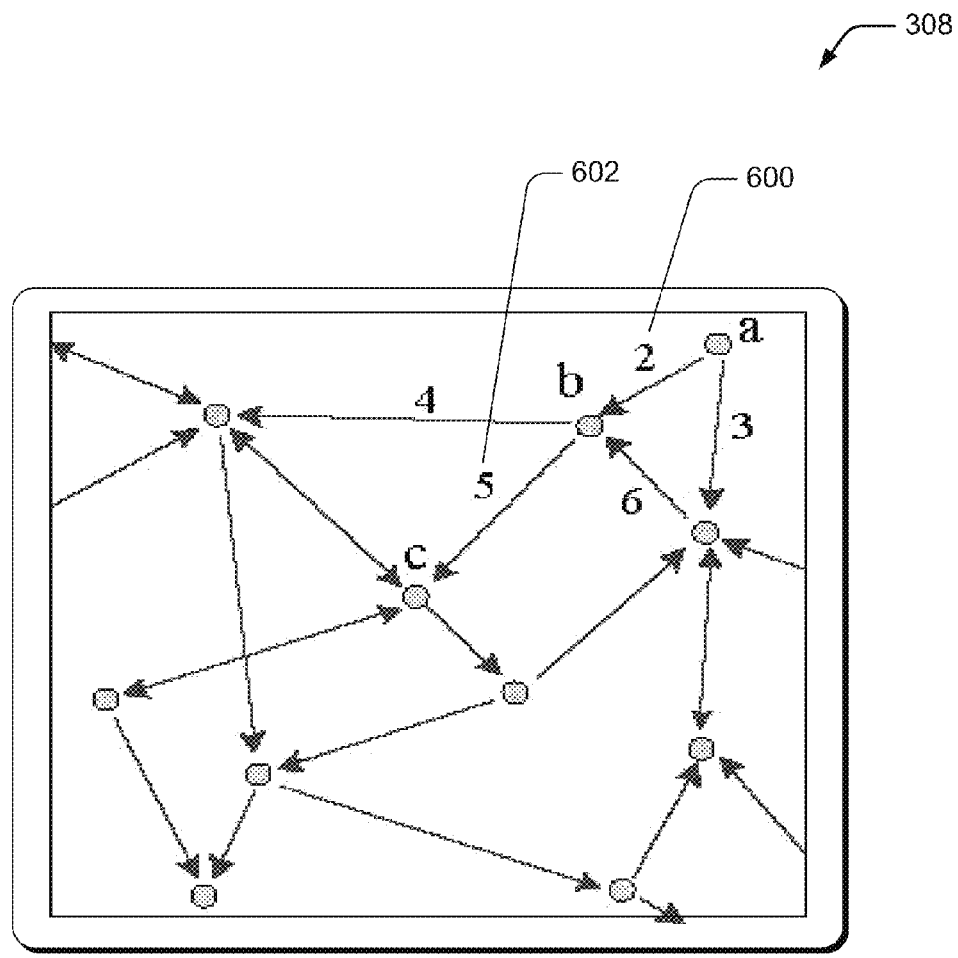
FIG. 6 illustrates an example graph of regions with links connecting the regions based on transitions being formulated between the regions.

The outlier application 110 builds the graph of regions with a node representing a region and a link representing traffic flow among the regions as shown with reference to FIG. 6.

Example Map of Partitioned Geographical Area into Regions

Figure 4:
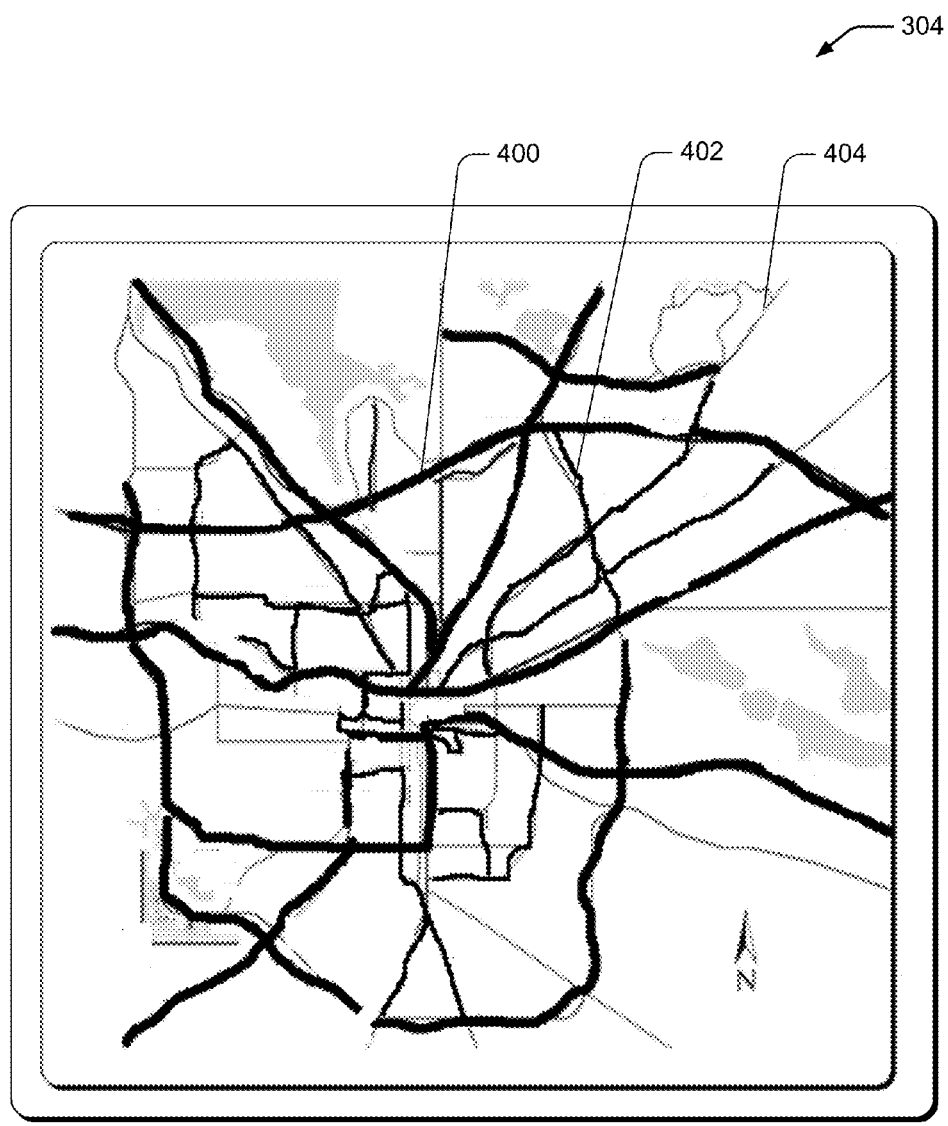
FIG. 4 illustrates an example map of a geographical area partitioned into regions based at least on using major roads.

FIG. 4 illustrates an example map of partitioning the geographical area into regions based at least on using major roads 304. For instance, the outlier application 110 divides the map of the geographical area into disjoint regions, which includes: communities, neighborhoods, subdivisions, roads, streets, and the like. The roads facilitate transportation while the streets facilitate public interaction. The roads include but are not limited to highways and motorways. The streets include but are not limited to pedestrian streets, alleys, city-centre streets, and the like.

In implementations, the outlier application 110 highlights the major roads 400 with a color or a heavy weight line. The major roads 400 may be referred to as a first zone that includes the top communities. Meanwhile, the outlier application 110 highlights the small roads 402 with another color or a medium weight line. The small roads 402 may be referred to a second zone that includes smaller areas, which are at a lower level than the first zone. Also, the outlier application 110 highlights the streets 404 with yet another color or a small weight line. The streets 404 may be referred to as a third zone that includes smallest areas, and at a lower level than the first zone and the second zone.

Formulating Transitions Between the Regions

Figure 5:
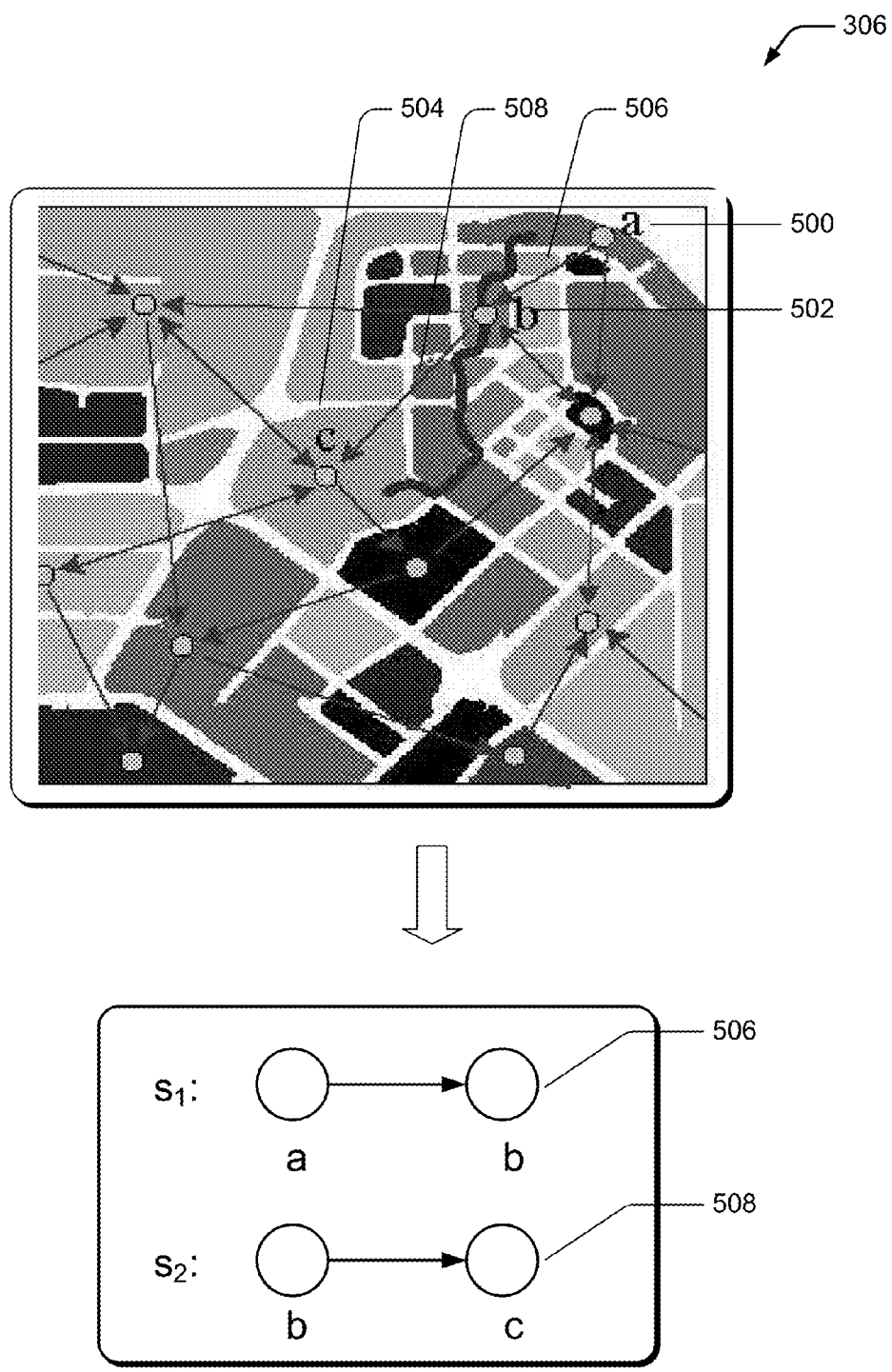
FIG. 5 illustrates an example partitioned map of trajectories shown travelling through the regions.

FIG. 5 illustrates an example process of formulating transitions of the trajectory travelling between the regions 306. The figure illustrates a first region represented by alphabet letter a 500, a second region represented by alphabet letter b 502, and a third region represented by alphabet letter c 504. A trajectory $Tr_1$ 506 traverses from a first node in region a 500 to a second node in region b 502. Another trajectory $Tr_1$ 508 traverses from the second node in region b 502 to a third node in region c 504.

Turning to the diagram below, the trajectory passing through three regions, region a 500, region b 502, and region c 504 results in two transitions shown as $s_1$ 506 and $s_2$ 50. The trajectory 506 traverses from region a 500 to b at 502 to formulate a transition of a→b. The second trajectory 508 traverses from b at 502 to c at 504 to formulate a transition of b→c.

FIG. 6 illustrates the outlier application 110 generating links to connect the regions based on the transitions formulated 308. Each time frame may be comprised of a fixed number of time bins represented by q. For each time bin q, a link may be represented by $Lnk_i$=<$Rgn_o$, $Rgn_d$>, which is associated with a feature vector of three properties $\vec{f}_{i,j}$=<#Obj, $Pct_o$, $Pct_d$>. The first property, #Obj is a total number of objects on the links from objecting moving from the $Rgn_o$ to the $Rgn_d$. The second property, $Pct_o$ represents a proportion of #Obj among all of the objects moving out of $Rgn_o$ in this time bin, q. The third property, $Pct_d$ represents a proportion of #Obj among all of the objects moving into $Rgn_d$ in time bin, q.

A number on each link indicates a number of transitions pertaining to the link. For instance, a property of link a→b may be represented by:

$$<\vec{f}_{i,j} = <\#Obj = 2, Pct_o = \frac{2}{2+3} = 0.4, Pct_d = \frac{2}{2+6} = 0.25>$$

where a number 2 at 600 between region a and region b indicates two transitions pertaining to the link. In yet another example, a number 5 at 602 between region b and region c indicates five transitions pertaining to the link. The links help with the data sparseness problem.

Detecting Outliers from the Graph of Regions

Figure 7:
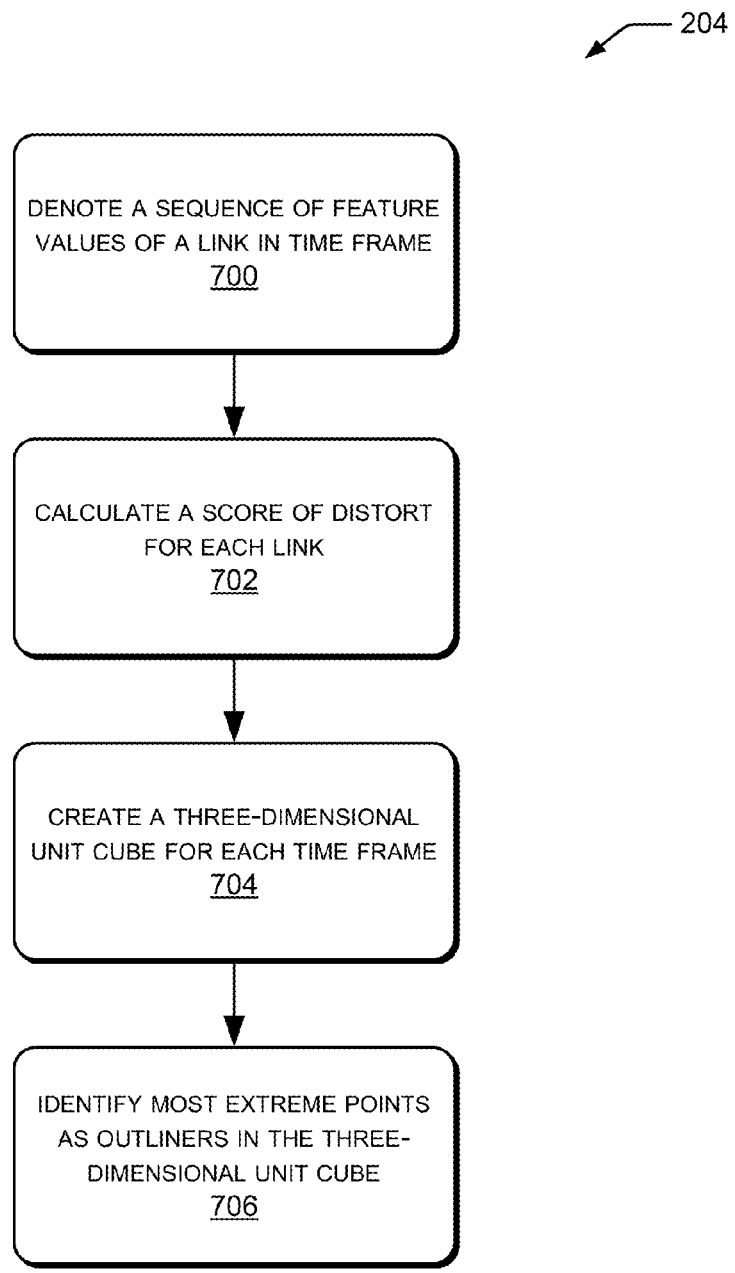
FIG. 7 is a flowchart showing an example process of detecting outliers from the graph of regions.

FIG. 7 is a flowchart showing phase 204 (discussed at a high level above) of an example process of detecting outliers from the graph of regions. As discussed above, a time frame is a set of consecutive time intervals. Each time frame or time period may be comprised of a fixed number of time bins represented by q. The outlier application 110 denotes a sequence of feature values of a link 700, $Lnk_i$ in a time frame of $tf_j$, by: $F_{i,j}=<\vec{f}_{i,j-q+1}, \vec{f}_{i,j-q+2}, \ldots, \vec{f}_{i,j}>$.

Next, the outlier application 110 calculates a score of distort for each link 702 by first calculating an Euclidean distance of a difference between each feature (i.e., #Obj) of two different time frames pertaining to a same link. This calculation is known as the score of distort and is performed using the graph of regions in the different time frames. The outlier application 110 computes each link against its precedent two time frames and its future two time frames. However, any number of precedent and future time frames may be used in the comparison. The score of distort denoted by $minDistort_{ij}$ is based on the outlier application 110 searching for the minimum difference for a feature between $tf_j$ and the same time frames of the same days on consecutive weeks. Thus, minDistort captures special patterns of traffic data that similar behaviors are observed among the same time of different days or the same day of different weeks.

The outlier application 110 uses an algorithm, minDistort, to calculate the score of distort of time sequences. As shown, in line 7 of the minDistort algorithm, the Euclidean distance is computed between two time frames of a link using the equation below:

$$\text{Distance}(tf_j, tf_t, Link_i) = \sqrt{\sum_{k=0}^{q-1} \|\vec{f}_{i,j-k} - \vec{f}_{i,t-k}\|^2}$$

The outlier application 110 obtains the score of distort $minDistort_{ij}$, which includes non-spatial and non-temporal attributes of each link in each time frame. The minDistort algorithm for calculating minimum distort of time sequences follows:

---
Algorithm minDistort: calculating
minimum distort of time sequences
---

Input: $Link_i$: a link; $tf_j$: a time frame; t: number of adjacent weeks to check
Output: $minDistort_{i,j}$: the degree of distort for link $Link_i$ in time frame $tf_j$
1: minDist ←+ Infinity;
2: T ← $tf_{j\pm u\ weeks, u} \in \{-t, \ldots, t\}$
3: for All time frames $tf_t$ in T do
4:     if $tf_t$ overlap with $tf_j$ then
5:         Continue;
6:     end if
7:     currentDist ← Distance($tf_j, tf_t, Link_i$);
8:     if currentDist < minDist Then
9:         minDist ← currentDist;
10: end if
11: end for
12: Return minDist;

---

The outlier application 110 identifies extreme values among minDistort of all links as temporal outliers. The outlier application 110 normalizes (i.e., subtract min value and divide by max value) the features of each links through all of the time bins into the range of [0,1], so any effects of different sizes of a region and different absolute volumes in a region are decoupled. Another advantage of using minDistort is that this prevents examining many repeating patterns where minDistort~0.

The outlier application 110 creates a three-dimensional unit cube for each time frame 704. The three-dimensional unit cube includes the features of $<\#Obj, Pct_o, Pct_d>$. The three-dimensional unit cube is discussed with reference to FIG. 9.

The outlier application 110 identifies most extreme points as outliers in the three-dimensional cube 706. For instance, the outlier application 110 normalizes the effect of variances among different directions by using Mahalanobis distance to measure the extremeness of data points. Mahalanobis distance finds extreme points of a set of many candidates. The outlier application 110 detects the outliers with links whose features have the largest difference from both their temporal neighbors for using "minDistort" and spatial neighbors for being detected among all links to represent spatiotemporal outliers (STOs). The outlier application 110 identifies the extreme points as outliers based on detecting abnormal links with either too low volumes or too high volumes, since extremeness of points are based on their Mahalanobis distances. Thus, each STO is a spatial link associated with a time frame. Each STO may be represented by its link, $Lnk_i$ containing an original region and a destination region and its time frame $tf_j$, i.e., $STO_{i,j}=<Rgn_{i,o}, Rgn_{i,d}, tf_j>$. The non-spatial and non-temporal attribute values of the STO are very different from values of spatiotemporal neighbors.

Figure 8:
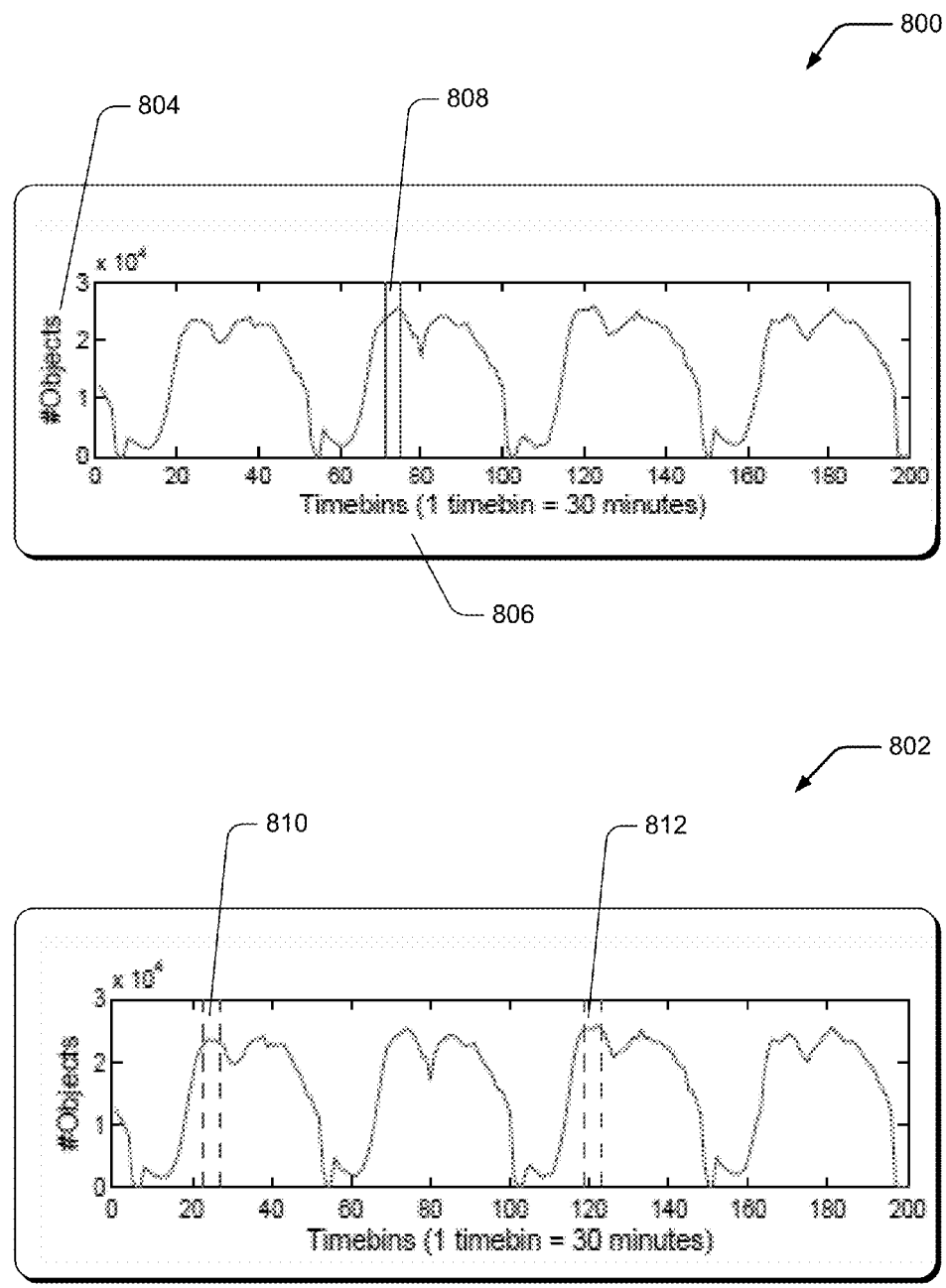
FIG. 8 illustrates example charts of a number of service vehicles travelling on a link over adjacent days.

FIG. 8 illustrates example charts 800, 802 of a number of service vehicles 102 travelling on a link over adjacent days. The top chart 800 shows #Objects on the y-axis 804, and Timebins on the x-axis 806. One timebin is approximately 30 minutes. A time period of 30 minutes is used but any time increment may be used. The top chart 800 further illustrates time frames 808 which include several timebins.

The outlier application 110 calculates the value of minDistort of the time frame 808 by calculating a smallest difference between the time frame 808 and the times frames at the same time in adjacent days as shown 810, 812.

Figure 9:
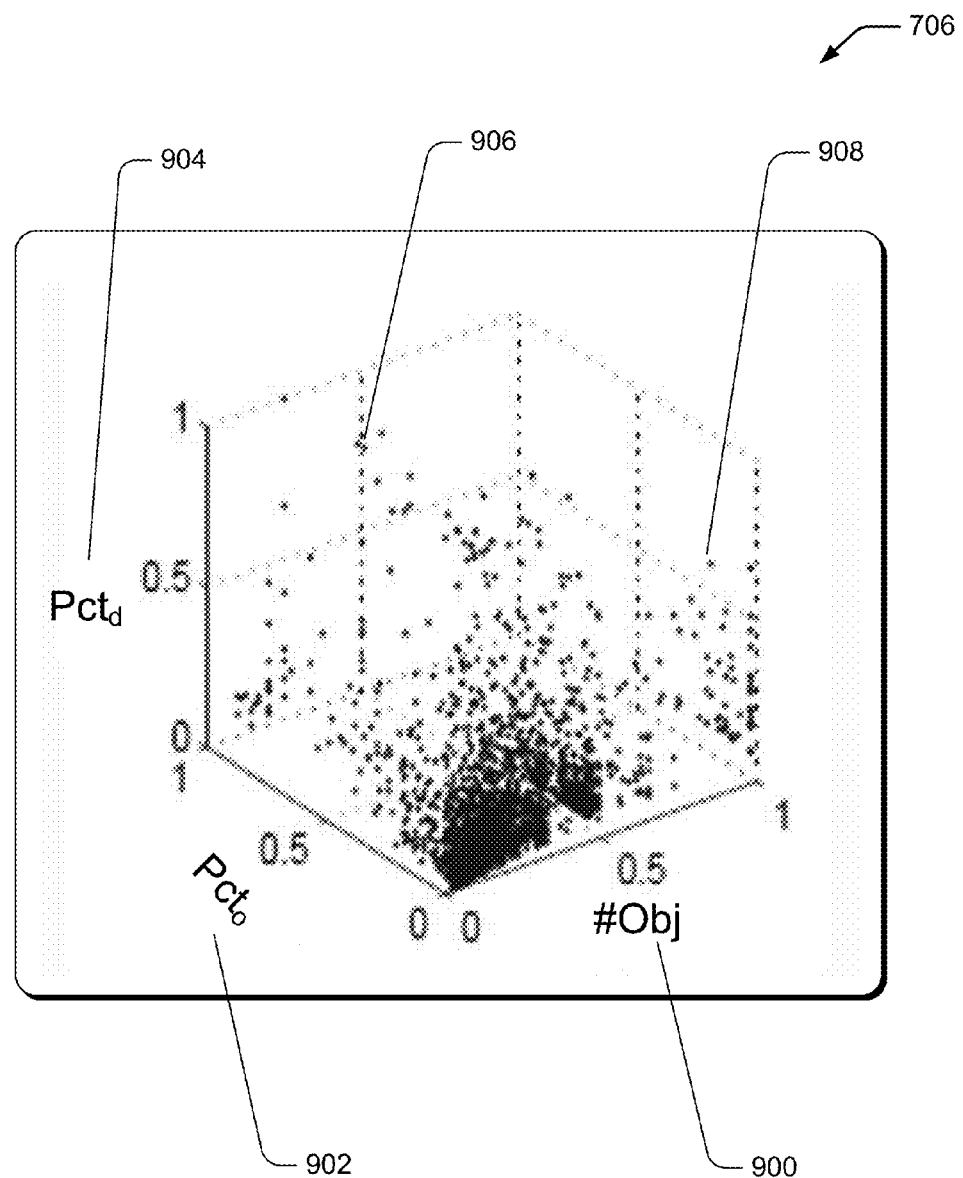
FIG. 9 illustrates an example three-dimensional init cube to detect outliers.

FIG. 9 illustrates an example three-dimensional cube to detect outliers 704. As previously discussed, the three-dimensional unit cube includes the features of #Obj in x-coordinate 900, $Pct_o$ in the y-coordinate 902, and $Pct_d$ in the z-coordinate 904 before normalization for computing into the Mahalanobis distance function. The outlier application 110 locates the most "extreme" points among all points as outliers, which are points whose distance are farthest to the center of the data cluster. For instance, points at 906, 908 may be considered as outliers. The points 906, 908 are the minimum distort values of corresponding features.

Constructing Outlier Trees Based on Temporal and Spatial Properties

Figure 10:
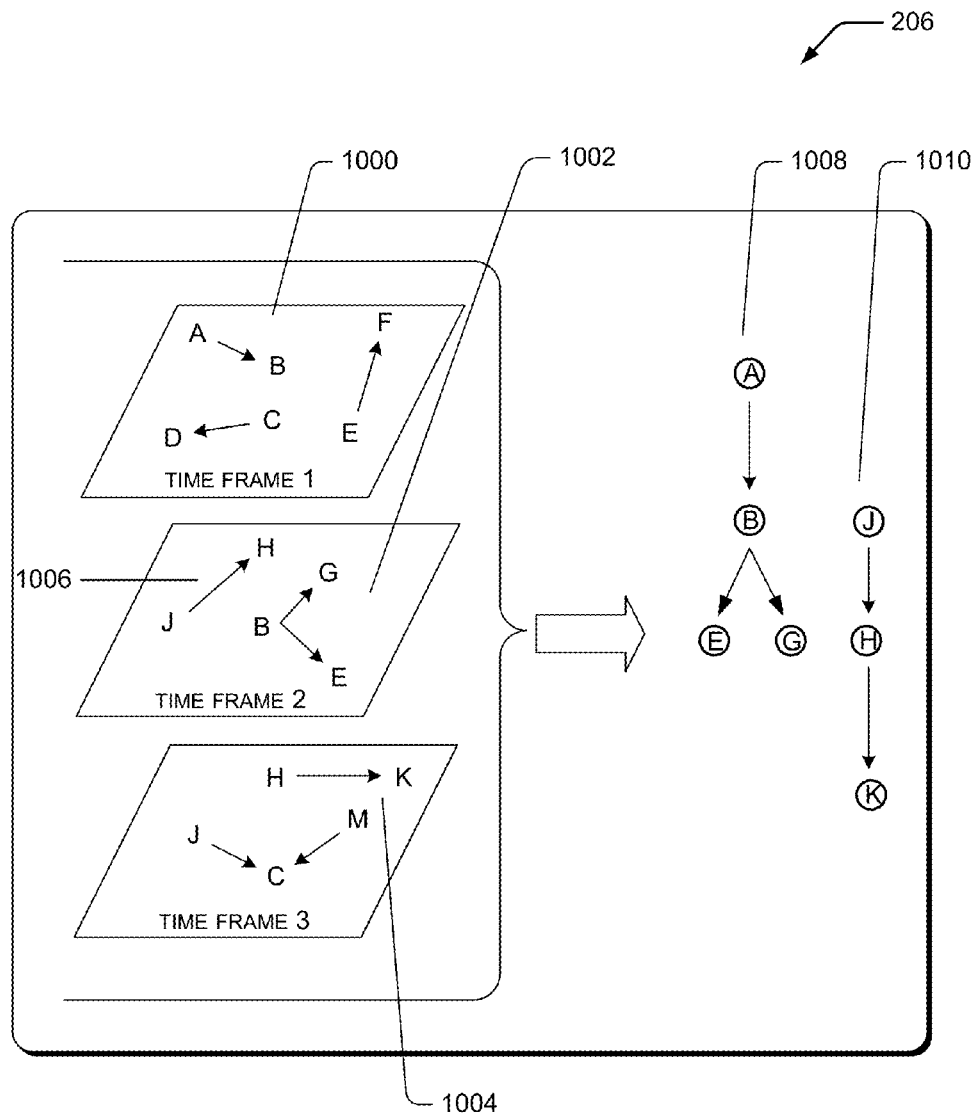
FIG. 10 illustrates an example process of building a forest of outlier trees.

FIG. 10 illustrates an example process of phase 206 (discussed at a high level above) of building a forest of outlier trees. The outlier application 110 uses an algorithm, referred to as STOTree algorithm, to find outlier dependencies by looking at the relationships for outliers from the earliest time frame through the last time frame. The STOTree algorithm provides insight that an outlier $STO_1$ is a parent of another outlier $STO_2$ if (a) $STO_1$ occurred before $STO_2$ in time and (b) the outlier $STO_1$ outliers and the another outlier $STO_2$ are spatially correlated. The outlier application 110 uses the STOTree algorithm to construct the outlier trees from detected outliers, which results in a collection of trees (i.e., a forest). The STOTree algorithm for constructing outlier trees is shown below:

---
Algorithm STOTree: constructing all outlier trees
---

Input: STOutlier: a set of spatial-temporal outliers of size t x k where t is the number of time frames, and k is the number of outliers to examine in a time frame.

Algorithm STOTree: constructing all outlier trees

Output: STOTrees: a list of roots of spatial-temporal trees.
1: STOTrees ← an empty set { };
2: for Each time frame i(i ∈ (1, ... , t)) do
3:     for Each outlier j(j ∈ (1, ... , k)) in timeframe i do
4:         STORoot$_{i,j}$ ← Find ← FindAllChildren(STOutlier$_{i,j}$, i);
5:         STOTrees ← STOTrees ∪ STORoot$_{i,j}$;
6:     end for
7: end for
8: Return STOTrees;
   Subroutine: FindAllChildren(STOutlier$_{i,j}$, i)
9: if Time frame i is the last time frame then
10:    Return STOutlier$_{i,j}$;
11: end if
12: STOutlier$_{i,j}$.subnodes ← an empty set { };
13: for Each outlier u(u ∈ (1, ... , k)) in time frame i + 1 do
14:    if STOTrees contains STOutlier$_{i+1,u}$ then
15:        continue;
16:    end if
17:    if STOutliers$_{i,j}$.Rgn$^d$ == STOutlier$_{i+1,u}$.Rgn$^o$ then
18:        STOutlier$_{i,j}$.subnodes ← STOutlier$_{i,j}$.subnodes ∪
               FindAllChildren(STOutlier$_{i+1,u}$, i + 1);
19:    end if
20: end for
21: Return STOutlier$_{i,j}$;

The STOTree algorithm shows a subroutine at lines 9 to 21 is a recursive function used to retrieve all possible descendants of a node. For each time frame, the recursive function is called on each outlier of a current time frame to compare with each outlier of a next time frame, unless "current" outlier tree already contains outliers of the next time frame shown at lines 14 to 16. The overall time complexity of the outlier tree construction process on each time frame is upper bounded by $O(k^2)$ where k represents a number of outliers in a time frame.

The outlier application 110 places no restrictions in the STOTree algorithm for a maximum size of outlier trees, based on assumptions that abnormal events caused by a single accident is not expected to last for a long time and that sizes of outlier trees should not grow infinitely. Typically, a maximum size of outlier trees tends to be small.

The STOTree algorithm executed by a processor, constructs the outlier tree as shown in FIG. 10. At 1000, the STOTree algorithm uses top three outliers in three consecutive time frames, so the input parameters in the STOTree algorithm are k=3 and t=3. The STOTree algorithm starts from time frame 1 shown at line 2 and for each of the top three outlying links shown from lines 3 to 6, A→B, C→D, and E→F 1000. The STOTree algorithm performs searches in time frame 2 from lines 13 to 20 and checks whether there is any following link that can be a child of previous link from lines 17 to 19. The STOTree algorithm finds outlying links B→G and B→E 1002 as children of A→B. The STOTree algorithm further identifies outlying link H→K 1004 in time frame 3 as a child of J→H 1006 in time frame 2.

From the left time frames 1-3, the STOTree algorithm constructs a first outlier tree 1008 and a second outlier tree 1010, which forms a forest. The forest containing all outlier trees may be represented by T.

Determining Spatiotemporal Causal Relationships from the Outlier Trees

The outlier application 110 identifies the most significant and recurring causal relationships corresponding to the most frequent subtrees of T. The outlier application 110 uses an algorithm, Subtree algorithm, to discover the frequent subtrees that occur through node insertion on the trees.

The Subtree algorithm follows:

Algorithm Subtree: discovering frequentsubtree from STOutlier trees

Input: STOTrees: a list of roots of spatial-temporal trees; ∈: a support threshold for frequent substructure selection.
Output: frequentsubtrees: a list of roots of frequent spatial-temporal subtrees.
1: //Form a list of frequent nodes (i.e. frequent trees of size 1).
2. numTrees ← number of roots in STOTrees;
3. frequentNodes ← unique nodes appearing at least numTrees × ∈ times in STOTrees.
4: mergeTarget ← frequentNodes
5: frequentSubtrees ← an empty set { };
6: while size(mergeTarge) > 0 do
7:     // Form candidates of frequent subtrees;
8:     subtreeCandidates ← a empty set { };
9:     for each node singleton$_i$ in mergeTarge do
10:        for Each root root$_j$ in mergeTarget do
11:            if nodeInsertion(root$_j$, singleton$_i$) then
12:                subtreeCandidates ← subtreeCandidates ∪ root$_j$;
13:            end if
14:        end for
15:    end for
16:    // Filer subtree candidates be threshold of support ∈;
17:    Clear mergeTarget;
18:    for Each candidate candidate$_i$ in subtreeCandidates do
19:        count ← 0;
20:        for Each root root$_j$ in mergeTarget do
21:            if root$_j$ contains candidate$_i$ then
22:                count ← count + 1;
23:            end if
24:        end for
25:        if count >∈ × numTrees then
26:            frequentSubtree ← frequentTrees ∪ candidate$_i$;
27:            mergeTarget ← mergeTarget ∪ candidate$_i$
28:        end if
29:    end for
30: end while
31: Return frequentSubtrees;

The Subtree algorithm first finds all single nodes whose support exceeds a threshold ∈ shown in line 3 to use this set of frequent single nodes to form candidates of frequent subtrees. The "while" iteration from lines 6 to 30 first generates candidates of subtrees from lines 9 to 15, checks the support of each candidate, and then performs filtering from lines 18 to 29 according to the threshold E.

The outlier application 110 generates subtree candidates by increasing sizes of the subtrees by one by inserting a frequent single node into previous frequent subtrees. This node insertion process may be performed by an algorithm, node insertion algorithm shown below:

Algorithm: node insertion: inserting a node to an outlier tree

Input: Root: a root of an outlier tree; Singleton: a node to be inserted.
Output: true/false: whether or not the node insertion is successful.
1: if Root.Rgn$_d$ equals singleton.Rgn$_o$&& Root.subnodes does not contain singleton then
2:     Root.subnodes ← Root.subnodes ∪ singleton;
3:     Return true:
4: else
5:     if size(Root.subnodes)==0 then
6:         Return false;
7:     else
8:         for Root of each subnode subRoot in Root.subnodes do
9:             if InsertNode(subRoot, Singleton) then
10:                Return true;
11:            end if
12:        end for
13:    end if
14: end if
15: Return false;

The node insertion algorithm compares a single node with a root of the tree, and inserts the single node as a subnode of the root at lines 1 to 3, if the root can be a parent of the single node and its existing children do not contain the single node. Otherwise, the single node is compared and checked whether it can be inserted into branches below the root (i.e., a recursive process shown in lines 8 to 12). Returning to the subtree algorithm, the frequency of the candidate increases by one if all of the nodes with their immediate subnodes of the candidates have an exact match with a discovered outlier tree from lines 21 to 23.

An outlier causality may be associated with a region origin, a region destination and a time frame caused by a spatiotemporal outlier if the following conditions hold true: the destination of the spatiotemporal outlier is the same as the origin of the outlier causality and the time frames associated with the outlier causality and the spatiotemporal outlier are consecutive to each other and the time frame associated with the spatiotemporal outlier is ahead of the time frame associated with the outlier causality.

The spatiotemporal causal interactions may include abnormal traffic flow due to parades, marches, protests, insufficient number of roads in the regions, insufficient number of lanes on existing roads, insufficient land use, and the like. The outlier application 110 provides recommendations based on the spatiotemporal causal relationships. For example, the outlier application 110 may recommend but is not limited to, diverting traffic to less travelled roads, building additional roads, suggesting a bus route, suggesting a subway line, converting streets to one way streets, adding more lanes to streets, adding another subway line, adding a train stop, and the like.

The techniques described here may be easily adapted to other technologies. For example, the techniques may be used to find outliers in various applications on the Internet, to detect changes in the climate, and to detect medical conditions.

Example Server Implementation

Figure 11:
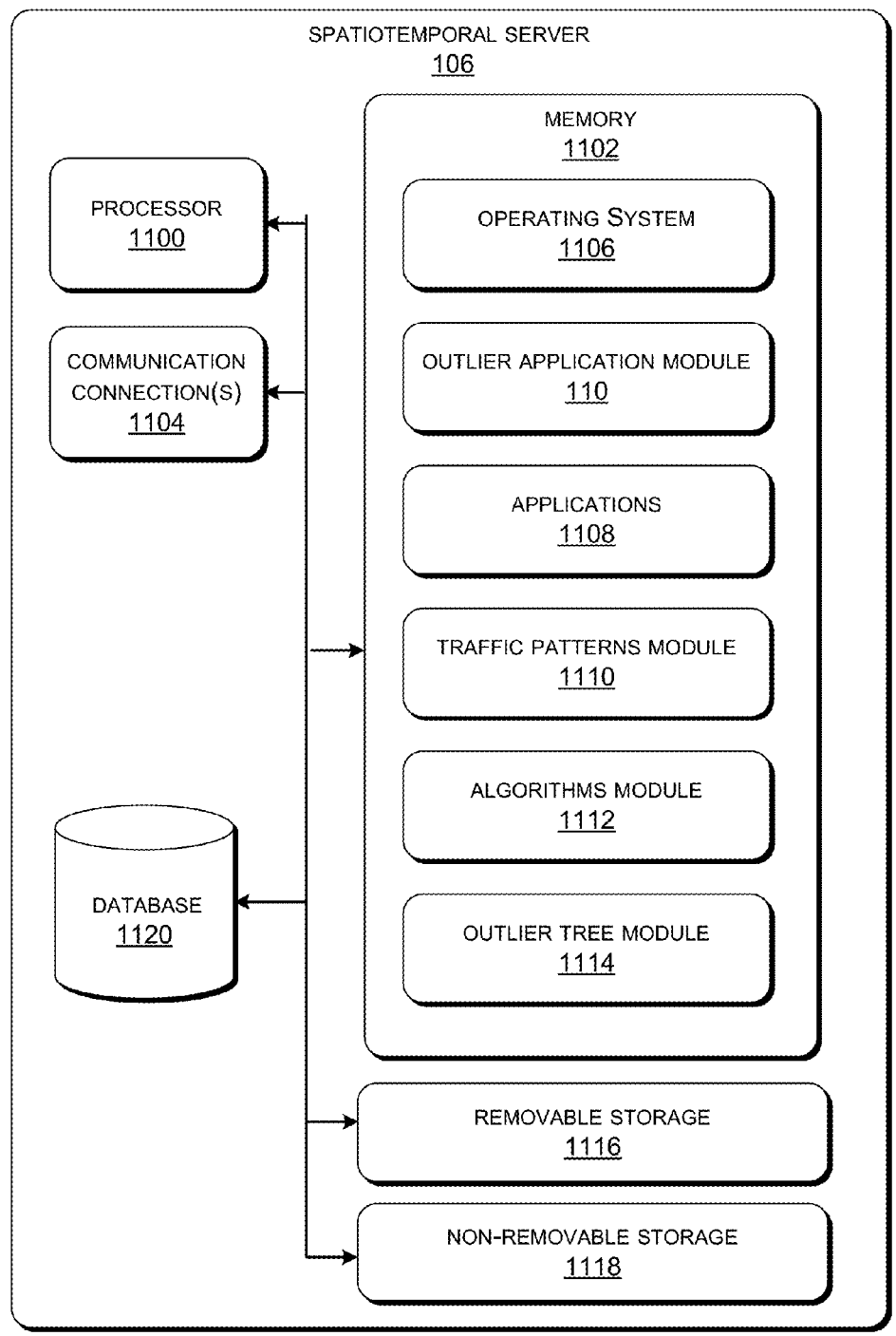
FIG. 11 is a block diagram showing an example server usable with the environment of FIG. 1.

FIG. 11 is a block diagram showing an example server 106 to be used for the outlier application 110. The spatiotemporal server 106 may be configured as any suitable system capable of services, which includes, but is not limited to, implementing the outlier application 110 for detecting outliers and determining spatiotemporal causal interactions in the spatiotemporal data. In one example configuration, the server 106 comprises at least one processor 1100, a memory 1102, and a communication connection(s) 1104. The processor(s) 1100 may be implemented as appropriate in hardware, software, firmware, or combinations thereof. Software or firmware implementations of the processor(s) 1100 may include computer-executable or machine-executable instructions written in any suitable programming language to perform the various functions described.

Similar to that of computing environment 100 of FIG. 1, memory 1102 may store program instructions that are loadable and executable on the processor(s) 1100, as well as data generated during the execution of these programs. Depending on the configuration and type of computing device, memory 1102 may be volatile (such as random access memory (RAM)) and/or non-volatile (such as read-only memory (ROM), flash memory, etc.). Thus, memory 1102 includes volatile and nonvolatile, removable and non-removable media implemented in any method or technology for storage of information, such as computer-readable instructions, data structures, program modules, or other data.

The communication connection(s) 1104 may include access to a wide area network (WAN) module, a local area network module (e.g., Wi-Fi), a personal area network module (e.g., Bluetooth), and/or any other suitable communication modules to allow the spatiotemporal server 106 to communicate over the network(s) 108.

Turning to the contents of the memory 1102 in more detail, the memory 1102 may store an operating system 1106, the outlier application module 110, and one or more applications 1108 for implementing all or a part of applications and/or services using the outlier application 110. The one or more other applications 1108 may include an email application, online services, a calendar application, a navigation module, a game, and the like. The memory 1102 in this implementation may also include a traffic patterns module 1110, an algorithms module 1112, and an outlier tree module 1114. The outlier application module 110 may perform the operations described, perform the operations described with reference to the figures or in combination with the traffic patterns module 1110, the algorithms module 1112, and/or the outlier tree module 1114.

The algorithms module 1112 is configured to be executed on the processor 1100 to perform the many functions described above using the different algorithms. For instance, the algorithms module 1112 provides capabilities for the minDistort algorithm, the STOTree algorithm, the Subtree algorithm, and the node insertion algorithm.

The server 106 may also include additional removable storage 1116 and/or non-removable storage 1118 including, but not limited to, magnetic storage, optical disks, and/or tape storage. The disk drives and their associated computer-readable media may provide non-volatile storage of computer readable instructions, data structures, program modules, and other data for the computing devices. In some implementations, the memory 1102 may include multiple different types of memory, such as static random access memory (SRAM), dynamic random access memory (DRAM), or ROM.

Computer-readable media includes, at least, two types of computer-readable media, namely computer storage media and communications media.

Computer storage media includes volatile and non-volatile, removable and non-removable media implemented in any method or technology for storage of information such as computer readable instructions, data structures, program modules, or other data. Computer storage media includes, but is not limited to, RAM, ROM, erasable programmable read-only memory (EEPROM), flash memory or other memory technology, compact disc read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device.

In contrast, communication media may embody computer readable instructions, data structures, program modules, or other data in a modulated data signal, such as a carrier wave, or other transmission mechanism. As defined herein, computer storage media does not include communication media.

The server 106 may include a database 1120 to store the collection of GPS logs, trajectories, graphs, routes, models, maps of areas, outlier trees, and the like. Alternatively, this information may be stored on other databases.

The server 106 as described above may be implemented in various types of systems or networks. For example, the server may be a part of, including but is not limited to, a client-server system, a peer-to-peer computer network, a distributed network, an enterprise architecture, a local area network, a wide area network, a virtual private network, a storage area network, and the like.

Various instructions, methods, techniques, applications, and modules described herein may be implemented as computer-executable instructions that are executable by one or more computers, servers, or computing devices. Generally, program modules include routines, programs, objects, components, data structures, etc. for performing particular tasks or implementing particular abstract data types. These program modules and the like may be executed as native code or may be downloaded and executed, such as in a virtual machine or other just-in-time compilation execution environment. The functionality of the program modules may be combined or distributed as desired in various implementations. An implementation of these modules and techniques may be stored on or transmitted across some form of computer-readable media.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

What is claimed is:

1. A method implemented at least partially by a processor, the method comprising:
    accessing, from a database associated with a content service provider, logs of global positioning system (GPS) points collected by geolocation sensors associated with service vehicles;
    identifying geographical locations from the GPS points to represent an area where the service vehicles travelled as recorded in the logs;
    generating a graph of regions associated with the area based at least in part on the logs associated with the area in a plurality of time frames;
    detecting outliers in the GPS points based at least in part on the graph; and
    providing, via a user interface that is presented via a display of a device, recommendations for travelling in the area based at least in part on the outliers.

2. The method of claim 1, further comprising:
    dividing the area into the two or more regions based at least in part on major roads; and
    generating links for connecting pairs of regions of the two or more regions.

3. The method of claim 1, wherein generating the links is further based at least in part on a number of transitions pertaining to the links for the travel between the two or more regions.

4. The method of claim 3, wherein the number of transitions is associated with a departure time from at least a region of origin and an arrival time in at least a region of destination, the region of origin and the region of destination comprising at least two of the two or more regions of the area.

5. The method of claim 1, further comprising:
    calculating scores of minimum distort of features for each of the links in a particular time frame of the plurality of time frames; and
    identifying extreme values among the scores of minimum distort as at least some of the outliers.

6. The method of claim 5, wherein the calculating the scores of minimum distort includes computing an Euclidean distance to calculate a difference between each feature of two time frames of the plurality of time frames, wherein the two time frames pertain to a same link.

7. The method of claim 1, wherein a time frame of the plurality of time frames is determined based at least in part on:
    separating the GPS points into weekdays and at least one of weekends or holidays of a year; and
    assigning the GPS points to time bins representative of thirty minute increments of a day.

8. The method of claim 1, further comprising:
    creating a three-dimensional unit cube for individual time frames of the plurality of time frames, the three-dimensional unit cube including a feature vector comprising:
    a total number of service vehicles on a link between an origin region and a destination region of the regions associated with the area;
    a proportion of the service vehicles among the total number of the service vehicles moving out of the origin region during a particular time frame; and
    a proportion of the service vehicles among the total number of the service vehicles moving into the destination region in the particular time frame and identifying extreme points farthest away from a center data cluster as at least some of the outliers in the particular time frame.

9. The method of claim 1, further comprising:
    constructing outlier trees based on temporal and spatial properties of the outliers being detected by determining dependencies of the outliers from a first time frame of the plurality of time frames through a last time frame of the plurality of time frames;
    determining that a first outlier of the outliers occurred at a time before a second outlier of the outliers;
    determining that the first outlier and the second outlier are spatially correlated;
    determining that the first outlier is a parent of the second outlier; and
    adding the parent and a child that is dependent on the parent in the outlier trees.

10. The method of claim 1, further comprising determining spatiotemporal causal relationships from outlier trees by:
    constructing outlier trees based on temporal and spatial properties of the outliers being detected by determining dependencies of the outliers from a first time frame of the plurality of time frames through a last time frame of the plurality of time frames; and
    discovering frequent subtrees from the constructed outlier trees that correspond to a causality and a relationship among the frequent subtrees to represent abnormal traffic patterns in the GPS points.

11. The method of claim 10, further comprising providing the recommendations based at least in part on the frequent subtrees including abnormal traffic patterns, the recommendations including diverting traffic to less travelled roads, building additional roads, suggesting a bus route, or suggesting a subway line.

12. The computer storage media of claim 1, wherein the calculating the scores of minimum distort includes computing an Euclidean distance to calculate a difference between each feature of two time frames pertaining to a same link.

13. One or more computer storage media encoded with instructions that, when executed by a processor, perform acts comprising:

accessing, from a database associated with a content service provider, logs of global positioning system (GPS) points collected by geolocation sensors associated with service vehicles;

identifying geographical locations from the GPS points to represent an area where the service vehicles travelled as recorded in the logs;

generating links to connect two or more regions of the area based at least in part on a number of transitions pertaining to the links for travel of the service vehicles between the two or more regions; and detecting outliers in the GPS points in the geographical locations based at least in part on the links.

14. The computer storage media of claim 13, wherein:
at least some of the GPS points correspond to similar time spans in a year; and
the outliers are detected based at least in part on GPS points that correspond to the similar time spans in the year.

15. The computer storage media of claim 13, wherein the number of transitions is associated with a departure time from at least a region of origin and an arrival time in at least a region of destination, the region of origin and the region of destination comprising at least two of the two or more regions.

16. The computer storage media of claim 13, wherein the acts further comprise:
calculating scores of minimum distort of features for each of the links in a time frame; and
identifying extreme values among the scores of minimum distort as at least some of the outliers.

17. A device comprising:
one or more processors;
computer storage media; and
one or more modules maintained in the computer storage media and executable on the one or more processors to perform one or more operations comprising:
accessing, from a database associated with a content service provider, logs of global positioning system (GPS) points collected by geolocation sensors associated with service vehicles;
identifying geographical locations from the GPS points to represent an area where the service vehicles travelled as recorded in the logs;
dividing the area into a plurality of regions based at least in part on major roads;
generating links between pairs of regions of the plurality of regions based at least in part on travel by the service vehicles between the plurality of regions of the area in a plurality of time frames; and
detecting outliers in the GPS points in the geographical locations based at least in part on the links.

18. The device of claim 17, operations further comprising:
constructing outlier trees based on temporal and spatial properties of the outliers being detected by determining dependencies of the outliers from a first time frame of the plurality of time frames through a last time frame of the plurality of time frames;
determining that a first outlier of the outliers occurred at a time before a second outlier of the outliers, the first outlier and the second outlier being spatially correlated;
determining that the first outlier detected is a parent of the second outlier; and
adding the parent and a child that is dependent on the parent in the outlier trees being constructed.

19. The device of claim 17, operations further comprising:
constructing outlier trees based on temporal and spatial properties of the outliers being detected by determining dependencies of the outliers from a first time frame of the plurality of time frames through a last time frame of the plurality of time frames; and
discovering frequent subtrees from the constructed outlier trees that correspond to a causality and a relationship among the frequent subtrees to represent abnormal traffic patterns in the GPS points.

20. The device of claim 19, operations further comprising providing, via a user interface associated with the device, recommendations based at least in part on the frequent subtrees including abnormal traffic patterns, the recommendations including diverting traffic to less travelled roads, building additional roads, suggesting a bus route, or suggesting a subway line.

* * * * *